(12) United States Patent
Randhawa et al.

(10) Patent No.: US 8,768,288 B2
(45) Date of Patent: Jul. 1, 2014

(54) SYSTEMS AND METHODS FOR WIRELESS COMMUNICATIONS

(75) Inventors: Terjinder S. Randhawa, Surrey (CA); John Richards, Port Coquitlam (CA); Warren Lee, Vancouver (CA)

(73) Assignee: Mobile NewMedia Ltd., Surrey (CA)

( * ) Notice: Subject to any disclaimer, the term of this patent is extended or adjusted under 35 U.S.C. 154(b) by 0 days.

(21) Appl. No.: 12/841,147

(22) Filed: Jul. 21, 2010

(65) Prior Publication Data

US 2011/0021173 A1 Jan. 27, 2011

Related U.S. Application Data

(60) Provisional application No. 61/227,431, filed on Jul. 21, 2009.

(51) Int. Cl.
*H04M 11/04* (2006.01)

(52) U.S. Cl.
USPC ............ 455/404.1; 455/412.2; 455/418; 455/420

(58) Field of Classification Search
CPC ..... H04W 88/06; H04W 4/22; H04W 76/007; H04W 24/00; H04W 48/18; H04W 84/12; H04W 48/14; H04W 4/003; H04W 4/008; H04W 4/16; H04W 88/04; H04W 92/10
USPC ......... 370/338; 455/404.1, 553.1, 412.2, 413, 455/569.1, 11.1, 41.2, 418, 420; 600/300
See application file for complete search history.

(56) References Cited

U.S. PATENT DOCUMENTS

| | | | |
|---|---|---|---|
| 2003/0027547 A1* | 2/2003 | Wade | 455/404 |
| 2004/0199056 A1* | 10/2004 | Husemann et al. | 600/300 |
| 2005/0221866 A1* | 10/2005 | Huang et al. | 455/567 |
| 2008/0064375 A1* | 3/2008 | Gottlieb | 455/414.1 |
| 2008/0146291 A1* | 6/2008 | Huisken | 455/569.1 |
| 2009/0105548 A1* | 4/2009 | Bart | 600/300 |
| 2010/0008339 A1* | 1/2010 | Huang | 370/338 |

* cited by examiner

*Primary Examiner* — Dinh P Nguyen
(74) *Attorney, Agent, or Firm* — Oyen Wiggs Green & Mutala LLP

(57) ABSTRACT

A personal communications device configured to communicate with a wide area network in response to an alternate mode activation signal is provided. The personal communications device also comprises a signal broker operatively connected to a monitored interface from among the one or more interfaces along a control path. The signal broker is configured to monitor signals at the monitored interface and upon observing an alternate mode activation signal at the monitored interface, inject an alternate mode signal configured to initiate the alternate communication over the wide area network. In some embodiments, the alternate communication is different from a communication that would have occurred in the absence of the injected alternate mode signal. The alternate mode signal may comprise an emergency mode signal configured to initiate an emergency communication over the wide area network. The emergency communication may comprise an SMS message, a telephone call, an HTTP command, an email, or the like.

22 Claims, 14 Drawing Sheets

SYSTEMS AND METHODS FOR WIRELESS COMMUNICATIONS

REFERENCE TO RELATED APPLICATION

This application claims priority from U.S. application No. 61/227,431 filed 21 Jul. 2009 and entitled SYSTEMS AND METHODS FOR WIRELESS COMMUNICATIONS which is hereby incorporated herein by reference. For the purposes of the United States, this application claims the benefit under 35 U.S.C. §119 of U.S. patent application No. 61/227,431 filed 21 Jul. 2009 and entitled SYSTEMS AND METHODS FOR WIRELESS COMMUNICATIONS.

TECHNICAL FIELD

The invention is in the field of wireless communications. Particular embodiments provide systems and methods for wireless communication suitable for emergencies and/or other communication needs.

BACKGROUND

People are increasingly carrying personal communications devices with them in their daily lives. Some personal communications devices are designed to be amenable to habitual wearing or carrying by users. For instance, people commonly wear Bluetooth™ headsets which connect to cellular mobile, and which operate in cooperation with the mobile phones for making and receiving telephone calls. Personal communications devices designed to be amenable to habitual wearing or carrying by users are sometimes referred to as "handsfree personal communications devices," or "handsfree devices" for short.

In comparison to mobile phones, handsfree devices typically have limited capabilities due to factors including constraints on size, weight, cost and the like. Some handsfree devices are operable to communicate wirelessly with other personal communications devices (e.g., mobile phones). Through communication with such other communications devices, handsfree devices provide additional capabilities they could not provide alone. For example, Bluetooth™ headsets that connect wirelessly to Bluetooth™ enabled mobile phones provide the capability for a user of the Bluetooth™ headset to make a telephone call in cooperation with the connected mobile phone.

The range of functionality which a handsfree device may have when cooperating with a personal communication device is typically fixed by one or both of the user interface of the handsfree device and the interface(s) by which the handsfree device and personal communication device communicate with one another. In some cases, the user interface of the handsfree device limits the range of functionality which can be accessed by a user of handsfree device to a subset of the potential functionality enabled by the personal communication device or to a subset of the potential functionality enabled by the communication interface(s) between the handsfree device and the personal communication device.

Example areas of potential functionality not accessible from some handsfree devices include:

emergency communications;

SMS messaging;

direct number dialing; and/or the like.

SUMMARY

The following embodiments and aspects thereof are described and illustrated in conjunction with systems, tools and methods which are meant to be exemplary and illustrative, not limiting in scope.

An aspect of the invention provides a personal communications device configured to communicate with a wide area network. The personal communications device comprises a control path comprising one or more functional modules, the one or more functional modules comprising a LAN interface module, and one or more interfaces for communicating, along the control path and to or from the one or more functional modules, signals generated in response to user input, the one or more interfaces comprising a LAN interface for communicating the signals along the control path and to or from the LAN interface module, and a signal broker operatively connected to a monitored interface from among the one or more interfaces, the signal broker configured to monitor signals at the monitored interface, and upon observing a signal satisfying an alternate mode activation criterion at the monitored interface, inject an alternate mode signal configured to initiate an alternate communication over the wide area network. In some embodiments, alternate communication is different from a communication, if any, that would have occurred in the absence of the injected alternate mode signal. In some embodiments the alternate mode activation criterion comprises an emergency mode activation criterion and an alternate mode signal comprises emergency mode signal configured to initiate an emergency communication over the wide area network. The emergency communication may comprise an SMS message, a telephone call, an HTTP command, an email, or the like.

Another embodiment provides a method in a personal communications device, the method comprising monitoring signals generated in response to user input at a monitored interface of a control path comprising one or more functional modules, the one or more functional modules comprising a LAN interface module, and one or more interfaces for communicating, along the control path and to or from the one or more functional modules, signals generated in response to user input, the one or more interfaces comprising a LAN interface for communicating the signals along the control path and to or from the LAN interface module, and upon observing a signal satisfying an alternate mode activation criterion, injecting an alternate mode signal configured to initiate an alternate mode communication over the wide area network. In some embodiments the alternate communication is different from a communication, if any, that would have occurred over the wide area network in the absence of the injected alternate mode signal. In some embodiments the alternate mode activation criterion comprises an emergency mode activation criterion and an alternate mode signal comprises an emergency mode signal configured to initiate an emergency communication over the wide area network. The emergency communication may comprise at least one of an SMS message, a telephone call, an email and an HTTP command, for example. In some embodiments the signals at the monitored interface comprise messages formatted and exchanged according to pre-defined rules of a communication protocol. In some such embodiments the communication protocol comprises a Bluetooth™ Hands-Free Profile control protocol.

In some embodiments the alternate mode activation criterion comprises a pattern comprising a plurality of AT commands and injecting the alternate mode signal occurs upon observing a signal matching the pattern. In some embodiments injecting the alternate mode signal comprises injecting the alternate mode signal at the monitored interface. In some embodiments injecting the alternate mode signal comprises injecting the alternate mode signal at an interface along the control path other than the monitored interface. In some embodiments injecting the alternate mode signal comprises injecting the alternate mode signal at an interface of a WAN control path other than the control path. In some such embodiments the interface of the WAN control path comprises an application programming interface and injecting the alternate mode signal comprises making a call to the application programming interface.

In some embodiments, the method is performed in a WLAN-WWAN device. In some embodiments, the method is performed in a WLAN device configured to communicate with the wide area network via a WLAN-WWAN device. In some embodiments the method is performed in a WLAN-WWAN device and the one or more interfaces are configured to communicate, along the control path and to or from the one or more functional modules, signals generated in response to user input entered at a WLAN device when the WLAN device is operatively connected to the WLAN-WWAN device.

In some embodiments the alternate mode activation criterion is user configurable. In some embodiments the alternate mode activation criterion corresponds to a pattern of user input. In some embodiments the alternate communication is user configurable.

In some embodiments, the method comprises, in a normal operating mode, monitoring signals at the monitored interface without modification and, upon observing the signal satisfying the alternate mode activation criterion, entering an alternate operating mode. In some embodiments, the method comprises, upon observing the signal satisfying the alternate mode activation criterion, discarding the signal satisfying the alternate mode activation criterion. In some embodiments, the method comprises obtaining data indicative of a user's condition, and the alternate mode signal is configured to initiate an alternate communication containing data indicative of the user's condition over the wide area network.

A further aspect of the invention provides a method in a personal communications device configured to communicate with a wide area network, the method comprising monitoring signals at a monitored interface of a control path comprising one or more functional modules, the one or more functional modules comprising a LAN interface module, and one or more interfaces for communicating, along the control path and to or from the one or more functional modules, signals generated in response to user input, the one or more interfaces comprising a LAN interface for communicating the signals along the control path and to or from the LAN interface module, and upon observing a signal satisfying an alternate mode activation criterion at the monitored interface, injecting an alternate mode signal configured to initiate an alternate mode communication over the wide-area network.

Yet another aspect of the invention provides a program product comprising a non-transitory medium carrying computer-readable instructions which, when executed by a controller in a personal communications device configured to communicate with a wide area network, cause the controller to monitor signals at a monitored interface of a control path comprising one or more functional modules, the one or more functional modules comprising a LAN interface module, and one or more interfaces for communicating, along the control path and to or from the one or more functional modules, signals generated in response to user input, the one or more interfaces comprising a LAN interface for communicating the signals along the control path and to or from the LAN interface module, and upon observing a signal satisfying an alternate mode activation criterion at the monitored interface, inject an alternate mode signal configured to initiate an alternate mode communication over the wide-area network.

Yet a further aspect of the invention provides a program product for adding alternate mode communications functionality to a personal communications device configured to communicate with a wide area network and having a control path comprising one or more functional modules, the one or more functional modules comprising a LAN interface module, and one or more interfaces for communicating, along the control path and to or from the one or more functional modules, signals generated in response to user input, the one or more interfaces comprising a LAN interface for communicating the signals along the control path and to or from the LAN interface module, the program product comprising a non-transitory medium carrying computer-readable instructions which, when executed by a computer operatively connected to the personal communications device installs computer-readable instructions on a non-transitory medium of the personal communications devices which, when executed by a controller of the personal communications device cause the controller to monitor signals at a monitored interface of the control path, and upon observing a signal satisfying an alternate mode activation criterion at the monitored interface, inject an alternate mode signal configured to initiate an alternate mode communication over the wide-area network.

Still another aspect of the invention provides a method for providing alternate mode communication functionality to a personal communications device configured to communicate with a wide area network and having a control path comprising one or more functional modules, the one or more functional modules comprising a LAN interface module, and one or more interfaces for communicating, along the control path and to or from the one or more functional modules, signals generated in response to user input, the one or more interfaces comprising a LAN interface for communicating the signals along the control path and to or from the LAN interface module, the method comprising storing a computer program in a computer readable medium accessible to a host computer, and in response to a request from the personal communications device, transmitting the computer program to the personal communications device, wherein when executed by a controller of the personal communications device, the computer program causes the controller to monitor signals at a monitored interface of the control path, and, upon observing a signal satisfying an alternate mode activation criterion at the monitored interface, inject an alternate mode signal configured to initiate an alternate mode communication over the wide-area network.

Still a further aspect of the invention provides a personal communications system comprising a WLAN device comprising a sensor configured to provide data indicative of a user's condition, a controller operatively coupled to the sensor to receive data indicative of the user's circumstances, the controller configured to inject a signal satisfying an emergency mode activation criterion into a control path upon detecting sensor data indicative of an emergency condition, and a WLAN-WWAN device associated with the WLAN device, the WLAN-WWAN device configured to communicate with a wide area network and comprising a signal broker operatively connected to a monitored interface along the control path, the signal broker configured to monitor signals at the monitored interface, and, upon observing a signal satisfying an alternate mode activation criterion at the monitored interface, inject an alternate mode signal configured to initiate an alternate communication over the wide area network.

Method embodiments may include features that correspond to features of apparatus embodiments described herein, and vice versa.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide systems and methods for wireless communication. Particular embodiments involve adapting common communication systems for use in emergency communications.

Figure 1:
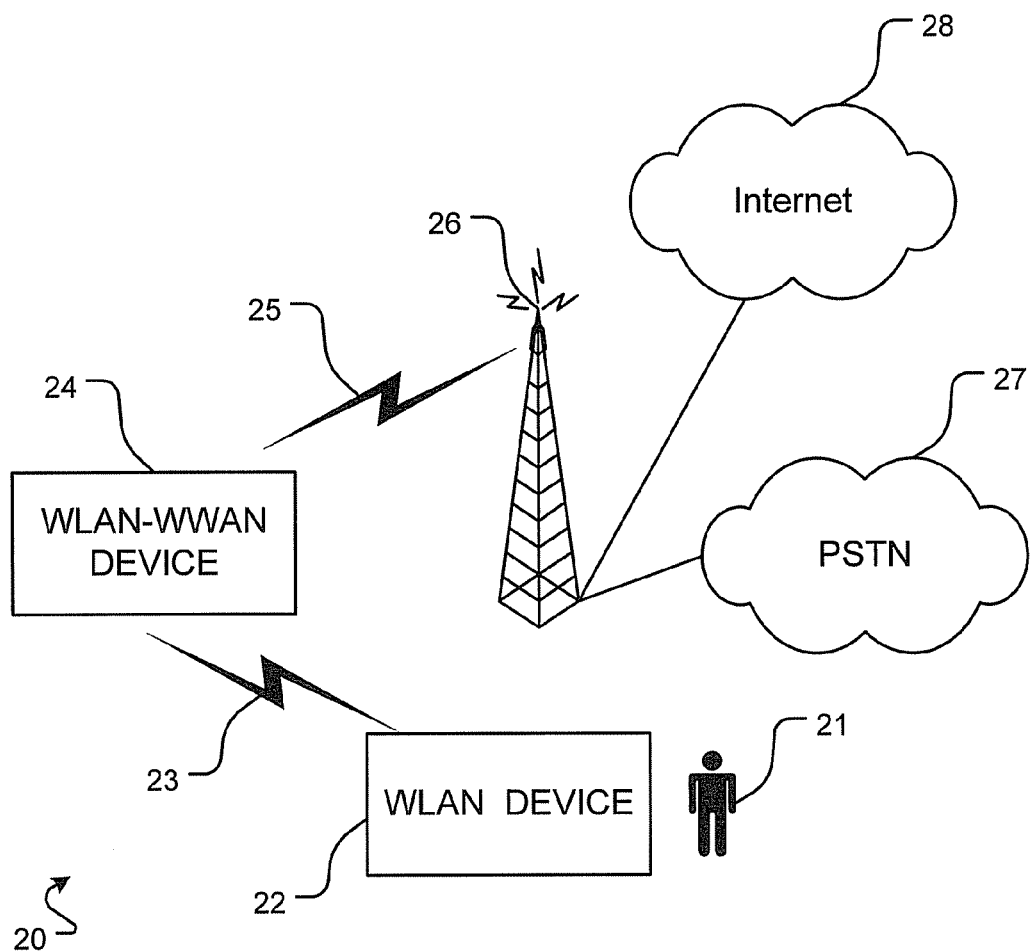
FIG. 1 is a block diagram of an example communication system.

FIG. 1 is a block diagram of an example communication system 20 by which a user 21 may communicate over a wide-area network using two personal communications devices in combination. User 21 operates a first personal communications device, in the illustrated embodiment wireless local area network (WLAN) device 22, to communicate over a public switched telephone network (PSTN) 27 and/or the internet 28. As a result of the user's input to WLAN device 22, WLAN device 22 communicates wirelessly with a second personal communications device, namely WLAN-WWAN device 24, over a wireless WLAN link 23. WLAN-WWAN device 24 in turn communicates wirelessly with a WWAN base station 26 over a wireless WAN link 25, and WWAN base station 26 communicates with either or both of PSTN 27 and internet 28. Return communications from PSTN 27 and/or internet 28 to WLAN device may follow the same path in reverse.

As used herein, the term local area network (LAN) is meant to include a personal area network (PAN) and as few as two devices having a local communication connection between them, and the term wireless local area network (WLAN) refers to a LAN that includes two or more devices that communicate wirelessly (via the LAN). For example, a Bluetooth™ headset and an associated Bluetooth™-enabled mobile phone may constitute a WLAN. References to links and networks in this description should be interpreted as encompassing wired and wireless links and networks, unless there is a specific indication to the contrary.

WLAN device 22 comprises a WLAN adapter which provides an interface to a WLAN and devices connected thereto. By way of non-limiting example, a WLAN adapter may comprise a Bluetooth™ adapter, an IEEE 802.11 adapter, ZigBee adapter, a wireless USB adapter, a combination thereof, or the like. WLAN device 22 may comprise a handsfree personal communications device, such as, for example, a bluebooth headset, a bluebooth communicator, or the like. WLAN device 22 may comprise a non-handsfree personal communications device, such as, for example, a personal digital assistant, embedded computing device, personal computer, or the like. Wireless WLAN link 23 may comprise a point-to-point single hop link or a multiple-hop link. Wireless WLAN link 23 may comprise, for example, a Bluetooth™ wireless connection, an 802.11 wireless connection, a ZigBee connection, a wireless USB connection, a combination thereof, or the like.

WLAN-WWAN device 24 comprises a WLAN adapter that provides an interface to a WLAN and devices connected thereto and a WWAN adapter that provides an interface to a WWAN and devices connected thereto. By way of non-limiting example, a WWAN adapter may comprise a Global System for Mobile communications (GSM) adapter, a Code Division Multiple Access (CDMA) adapter, a General Packet Radio Service (GPRS) adapter, an Enhanced Data Rates from GSM Evolution (EDGE) adapter, an International Mobile Telecommunications (IMT) 2000 adapter, a Universal Mobile Telecommunications System (UMTS) adapter, a CDMA2000 adapter, an High-Speed Downlink Packet Access (HSDPA) adapter, a WiMax (IEEE 802.16) adapter, a Long Term Evolution (LTE) adapter, a cellular WiFi adapter, a combination thereof, or the like. WLAN-WWAN device 24 may comprise a personal communications device, such as for example, a Blue tooth™ capable mobile phone, a Wi-Fi capable mobile phone, or a personal digital assistant, embedded computing device, personal computer, or the like.

User 21 may carry WLAN device 22 and/or keep it in close proximity to his or her person. WLAN device 22 may be designed to be amenable to constant or habitual carrying or wearing by user 21. For example, WLAN device 22 may comprise an earpiece headset, a binaural over-the-head headset, or the like. Where WLAN device 22 is designed to be amenable to constant or habitual carrying or wearing by a user, it is generally desirable that WLAN device 22 be relatively small in size and weight, consume little power, and cost relatively little to produce. For these and other reasons, WLAN device 22 may have a limited functionality user interface.

User 21 may be mobile with respect to either or both of WLAN-WWAN device 24 and base station 26. Some WWAN networks comprise a plurality of base stations 26, and user 21 may roam among these base stations. In some embodiments, user 21 and WLAN device 22 may roam among several WLAN-WWAN devices 24, which may or may not be connected to the same WLAN. Because WLAN device 22 communicates wirelessly with WLAN-WWAN device 24, user 21 can interact with and access functionality of WLAN-WWAN device 24 remotely and without having physical access to, or even knowledge of the location of, WLAN-WWAN device 24.

Figure 2:
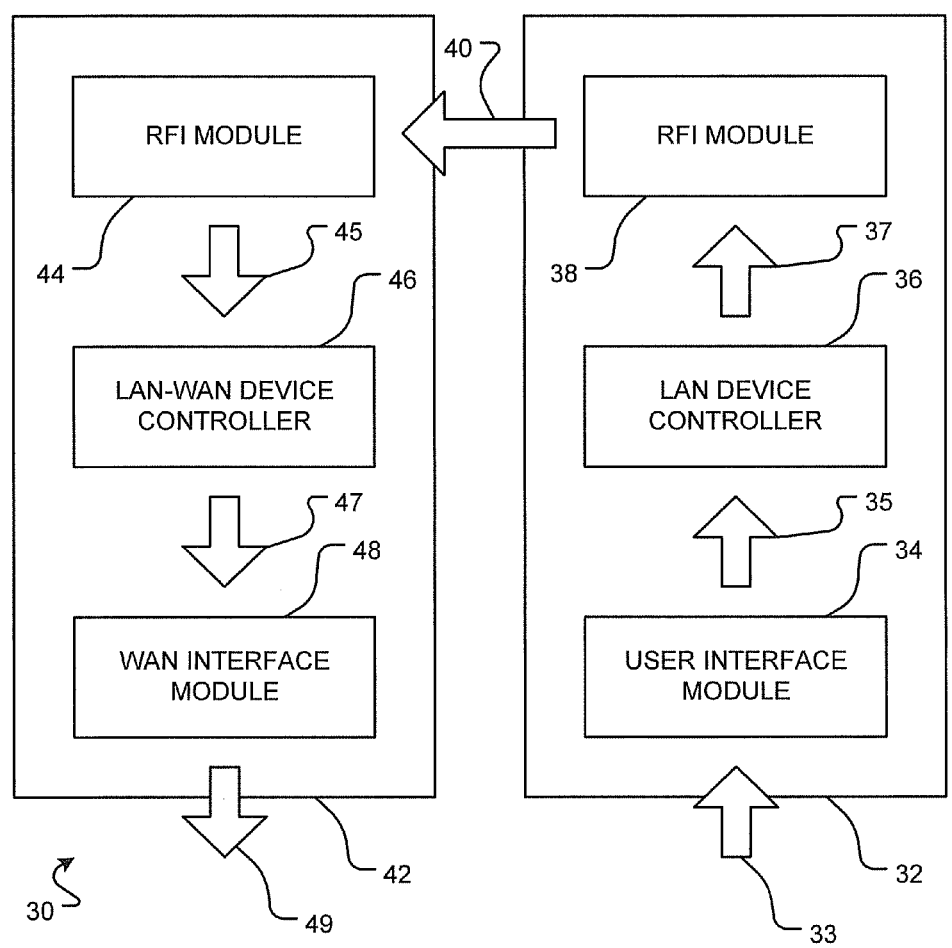
FIG. 2 is a block diagram of an example control path for user input to an example local area network (WLAN) device through an associated example local area network-wide area network (WLAN-WWAN) device.

FIG. 2 shows an example control path 30 for user input 33 to an example WLAN device 32 through an associated example WLAN-WWAN device 42. Example WLAN device 32 and WLAN-WWAN device 42 may correspond, respectively, to WLAN device 22 and WLAN-WWAN device 24 of communications system 20. Control path 30 shows an example of how a user of WLAN device 32 may interact with WLAN-WWAN device 42. In particular, control path 30 shows how functional modules in WLAN device 32 and WLAN-WWAN device 42 may respond to user input 33 provided to WLAN device 32. Control path 30 comprises a WAN control path (i.e., a control path by which a communication may be initiated over a WAN).

It is to be appreciated that control path 30 is merely an example control path. A control path may be bidirectional in whole or in part. WLAN and WLAN-WWAN devices may comprise a plurality of control paths, and two or more control paths may overlap in whole or in part.

User input 33 is provided at a user interface to a user interface module 34 of WLAN device 32. User input 33 may comprise, for example, a touch stimulus, an electrical stimulus, an audio stimulus, a combination thereof, or the like. In response to user input 33, user interface module 34 generates a WLAN device user control signal 35, which is provided to a WLAN device controller 36.

WLAN device controller 36 controls, at least in part, functionality of WLAN device 32. The functionality of WLAN device 32 includes, among other things, interaction with WLAN-WWAN device 42. For example, WLAN device 32 might be capable of communication with, access to, control of, and/or similar operations in respect of, WLAN-WWAN device 42.

In response to WLAN device user control signal 35, WLAN device controller 36 generates a remote functionality interface (RFI) control signal 37, which is provided to a RFI module 38. RFI module 38 is operable to communicate with a counterpart RFI module 44 on WLAN-WWAN device 42. RFI module 38 and RFI module 44 communicate over a LAN interface according to a shared communication protocol. By way of non-limiting example, RFI module 38 and RFI module 44 may comprise all or part of a Bluetooth™ protocol stack (including, for example, a Bluetooth™ controller, a Bluetooth™ host, a Bluetooth™ host controller interface (HCI), and/or implementations of one or more Bluetooth™ profiles), a Session Initiation Protocol (SIP) stack, combinations thereof, or the like.

RFI module 38 of WLAN device 32 transmits RFI signal 40 to RFI module 44 of WLAN-WWAN device 42. RFI signal 40 may comprise, for example, information, messages, instructions, commands, combinations thereof or the like, suitable for communicating with, instructing, accessing, controlling and/or performing like operations and combinations thereof with WLAN-WWAN device 42.

In response to RFI signal 40, RFI module 44 of WLAN-WWAN device 42 generates WLAN-WWAN device controller interface signal 45 which is provided to WLAN-WWAN device controller 46. WLAN-WWAN device controller 46 controls, at least in part, functionality of WLAN-WWAN device 42. Such functionality may comprise, for example, communication through a WWAN interface 48 (e.g. initiating a telephone call, sending an SMS message, sending an email message, updating a Web page) and interaction with other devices through RFI module 44 (e.g., signaling an incoming telephone call to WLAN device 32 along another control path (not shown)).

In response to WLAN-WWAN device controller interface signal 45, WLAN-WWAN device controller 46 communicates with WWAN interface module 48 via WWAN interface control signal 47. In response to WWAN interface control signal 47, WWAN interface module 48 communicates with a WWAN (not shown) via WWAN signal 49.

It is to be understood that though the functional modules of WLAN device 32 and WLAN-WWAN device 42 are shown as separate blocks along control path 30, these are logical divisions for the purpose of explanation only, and the blocks may be implemented in any suitable combination of hardware, software executing on hardware and/or firmware executing on hardware. For example, functional modules of WLAN device 32 and WLAN-WWAN device 42 may be implemented on a suitably configured controller, such as, for example, a microprocessor, a microcontroller, a field-programmable gate array (FPGA), another type of programmable logic device, combinations of the foregoing, or the like. For instance, each of RFI module 44, WLAN-WWAN device controller 46 and WAN interface module 48 may be implemented, in whole or in part, on a programmable microprocessor configured to run a plurality of different software modules (such as, for example, software objects, libraries, packages and the like) having suitable communication interfaces therebetweeen.

WLAN device user control signal 35, RFI control signal 37, RFI signal 40, LAN-WAN device control signal 45 and WAN interface control signal 47 may be configured to convey information over interfaces between associated functional modules of WLAN device 32 and WLAN-WWAN device 42. These signals may comprise messages formatted and exchanged according to one or more communications protocols.

The functional modules of WLAN device 32 and WLAN-WWAN device 42 respond to input according to specified behaviors. Where the behavior associated with an input is the generation of an output, it can be said that the input is mapped to the output. In control path 30, the functional modules of WLAN device 32 and WLAN-WWAN device 42 map input signals received at input interfaces to corresponding output signals at output interfaces, which in turn may be provided as inputs to other functional modules. For example, user input 33 may comprise a physical stimulus, which is mapped by user interface module 34 to an electrical signal that is registered by WLAN device controller 36, WLAN device controller 36 in turn maps the registered electrical signal to a function call to RFI module 38, and RFI Module 38 in turn maps the functional call to a Bluetooth™ Hands Free Profile control command.

Mappings between inputs and outputs of functional modules along control path 30 may be defined according to service standards. For example, RFI module 38 may be configured to communicate with RFI module 44 according to Bluetooth™ Hands Free Profile, and so configured will map an RFI control signal indicative of a user's desires to redial the last dialed phone number (e.g., a call to a redial function implemented in RFI module 38) to a Bluetooth™ Hands Free Profile control command (e.g., an AT+BLDN command) in RFA signal 40. Where RFI module 44 is correspondingly configured, it will map the received AT+BLDN command (in RFA signal 40) to a WLAN-WWAN device controller interface signal 45 that causes WLAN-WWAN device controller 46 to redial the last dialed phone number (e.g., a call to a redial function implemented in RFI module 44). Where modules are connected to interfaces for interaction with other devices, mappings according to service standards are useful to ensure interoperability between devices.

Figure 3:
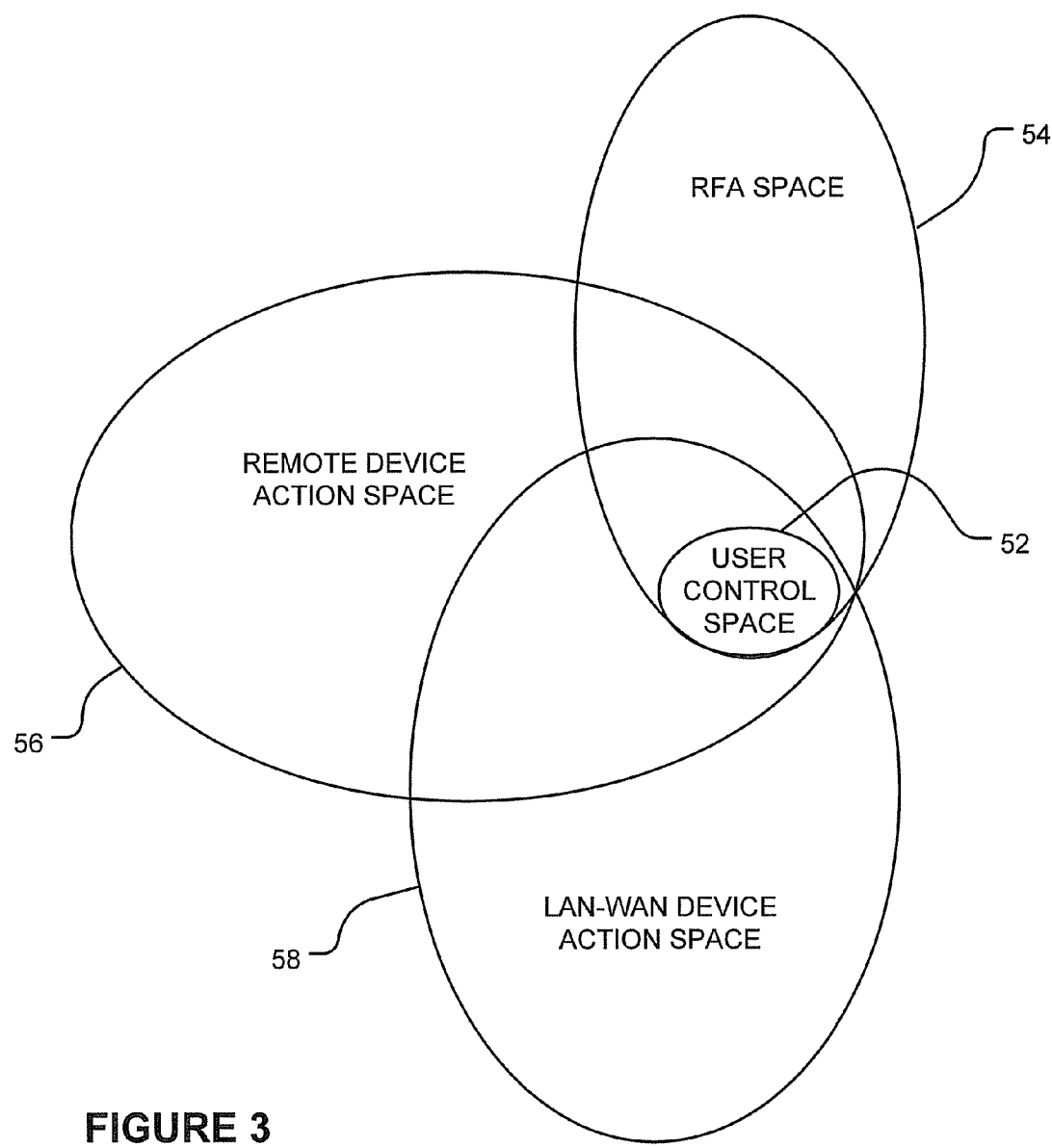
FIG. 3 is an interaction space diagram that illustrates an example range of interaction that a user of an example WLAN device may have with an example WLAN-WWAN device.

The range of responses that a functional module provides may be limited by the range of inputs to the functional module. FIG. 3 shows an interaction space diagram 50 that illustrates an example range of interaction that a user of WLAN device 32 may have with WLAN-WWAN device 42. User control space 52 represents the range of RFI control signal 37 that can be generated by WLAN device controller 36 in response to user input 33. User control space 52 is mapped onto a subspace of remote functionality access (RFA) space 54. RFA space 54 represents the range of RFA signal 40 that can be generated by RFI module 38. A portion of RFA space 54 that includes user control space 52 is mapped onto WLAN-WWAN remote control space 56. WLAN-WWAN remote control space 56 represents the range of WLAN-WWAN device controller interface signal 45 that can be generated by RFI module 44. A portion of WLAN-WWAN remote control space 56 that includes user control space 52 is mapped onto WLAN-WWAN device action space 58. WLAN-WWAN device action space 58 represents a range of possible actions at WLAN-WWAN device 42.

Interaction space diagram 50 shows that a user providing input to WLAN device 32 has access to only a portion of the functionality of WLAN-WWAN device 42 (i.e., the subspace of WLAN-WWAN device action space 58 onto which user control space 52 is mapped). This situation is typical of some personal communications systems. For example, some Bluetooth™ headsets have only volume control and binary call control user interface inputs. The volume control input is mapped to a signal that causes the volume of the audio output of the headset to change. The binary call control input is mapped to limited set of Bluetooth™ Hands Free Profile commands. For instance, the call control input may be mapped to a set of Bluetooth™ Hands Free Profile commands based on the state of the headset according to the following logic:

TABLE I

Call control input of an example Bluetooth ™ Headset

| Headset State | Call control input active |
|---|---|
| Incoming call | ATA (Receive an incoming call) |
| Call in-progress | AT + CHUP (Terminate call in-progress) |
| Idle | AT + BLDN (Redial the previously dialed number) |

Where a Bluetooth™ headset according to this example is paired with a mobile phone or similar device that supports the Bluetooth™ Hands Free Profile, a user of the headset will have access to only a subspace of the functionality of the mobile phone that is accessible using the subset of Bluetooth™ Hands Free Profile commands mapped to the call control input.

Some embodiments provide systems and methods that expand the range of WLAN-WWAN device actions accessible to a user of a WLAN device by expanding mappings of signals along control path 30 (FIG. 2). For example, the range of WLAN-WWAN device actions accessible to a user of a WLAN device may be expanded by implementing expanded signal mappings on either or both of a WLAN device and a WLAN-WWAN device. For instance, the subspace of WLAN-WWAN device action space 58 accessible to WLAN device 32 may be expanded by implementing expanded signal mappings of user input 33 to WLAN device user control signal 35, by implementing expanded signal mappings of WLAN device user control signal 35 to RFI control signal 37 and/or by implementing expanded signal mappings of RFI control signal 37 to RFI signal 40. Alternatively or additionally, the subspace of WLAN-WWAN device action space 58 accessible to WLAN device 32 may be expanded on WLAN-WWAN device 42 by implementing expanded signal mappings of RFI signal 40 to WLAN-WWAN device controller interface signal 45 and/or by implementing expanded signal mappings of WLAN-WWAN device controller interface signal 45 to WWAN interface control signal 47.

Expanding mappings may comprise brokering signals at one or more interfaces along a control path. Signal brokering may comprise, for example, observing, filtering, delaying, reordering and/or injecting new additional or alternative signals at one or more interfaces along one or more control paths. Signal brokering may introduce expanded mappings based, at least in part, on patterns of signals. For instance, signal brokering may comprise injecting additional or alternative signals upon observing one or more signals matching a particular pattern. Observed signals that match a particular pattern may be filtered (i.e., discarded), delayed, or observed without modification.

Patterns of signals on which expanded mapping are based may comprise patterns defined, in whole or in part, by temporal signal information and/or sequential signal information, for example. Temporal signal information may comprise, for example, present values of one or more signals, histories of values of one or more signals, time series values of one or more signals, time-spacing between particular signal values, time-spacing between consecutive signal values, and the like.

Signal brokering may introduce expanded mappings based, at least in part, on device state and event information, including device state and event information comprising information concerning states of, and events pertaining to, functional modules. State information may comprise present state information, time-series state information, sequential state information, and the like. Event information may comprise event notifications, time-series event information, sequential event information, and the like. In some embodiments, signal brokering introduces expanded mappings using combinations of patterns of signals and device state and/or event information.

Figure 3A:
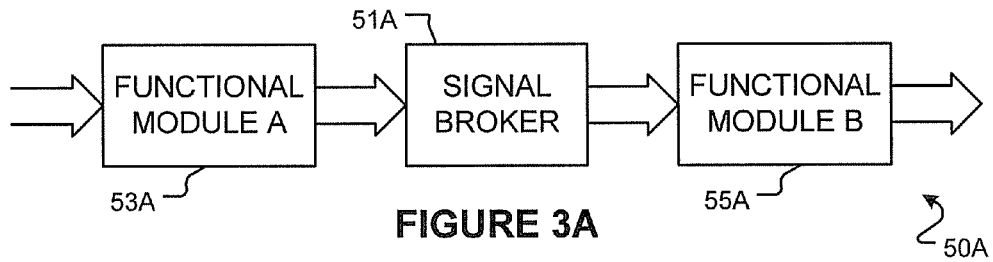
FIGS. 3A-3F are block diagrams of implementations of signal brokering according to a number of example embodiments.

FIGS. 3A-3F show block diagrams of example implementations of signal brokering along control paths. In FIG. 3A, a signal broker 51A is connected at an interface along a control path 50A between functional modules 53A and 55A. Signal broker 51A is interposed between functional modules 53A and 55A. In the absence of signal broker 51A functional modules 53A and 55A would be connected to a common interface. Signal broker 51A may be configured to expand signal mappings at functional module 55A by, for example, filtering one or more particular signals (e.g., a particular pattern of signals) output from functional module 53A and injecting additional or alternative signals as input to functional module 55A. Whereas the filtered signal from functional module 53A would have been mapped by functional module 55A to a first output signal, the additional or alternative signal injected by signal broker 51A may be mapped by functional module 55A to a second output signal different from the first output signal. The filtered signal is thus re-mapped from the first output signal to the second output signal.

Figure 3B:
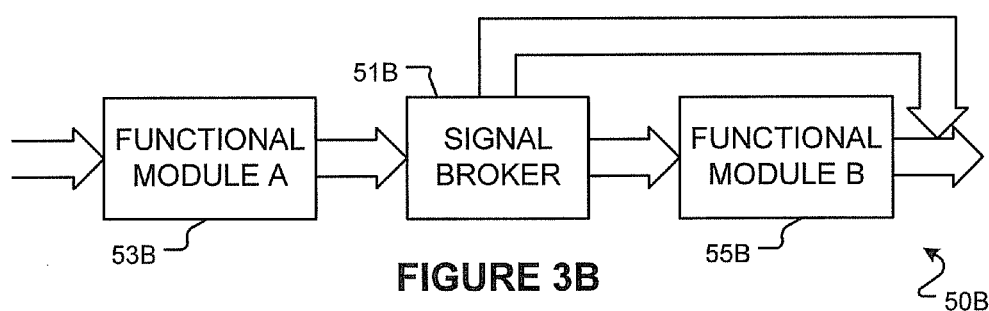

In FIG. 3B, a signal broker 51B is connected at two interfaces along a control path 50B. Signal broker 51B is connected at a first interface between functional modules 53B and 55B and connected at a second interface to functional module 55B. Signal broker 51B may be configured to expand signal mappings at functional module 55B by, for example, filtering one or more particular signals output from functional module 53B at the first interface and injecting an additional or alternative signal at the second interface. Whereas the filtered signal from functional module 53B would have been mapped by functional module 53B to a first output signal at the second interface, signal broker 51B injects an additional or alternative signal at the second interface which may be different from the first output signal. The filtered signal is thus re-mapped from the first output signal to the additional or alternative signal.

Figure 3C:
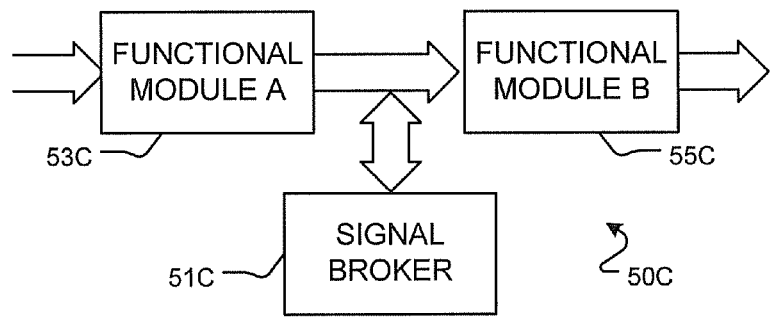

In FIG. 3C, a signal broker 51C is connected at an interface along a control path 50C between functional modules 53C and 55C. Signal broker 51C is connected to observe and inject signals at the interface between functional modules 53C and 55C, but, in the FIG. 3C embodiment, cannot intercept signals passing between functional modules 53C and 55C over the interface. Signal broker 51C is accordingly incapable of delaying, filtering or re-ordering signals passing between functional modules 53C and 55C over the interface. Signal broker 51C may be configured to expand signals mappings at functional module 55C by, for example, upon observing one or more particular signals output from functional module 53C, injecting an additional signal as input to functional module 55C. The observed signal from functional module 53C is mapped by functional module 53C to a first output signal and the additional signal injected by signal broker 51C is mapped by functional module 53C to a second output signal. The observed signal from functional module 53C is thus re-mapped from the first output signal to the combination of the first and second output signals.

Figure 3D:
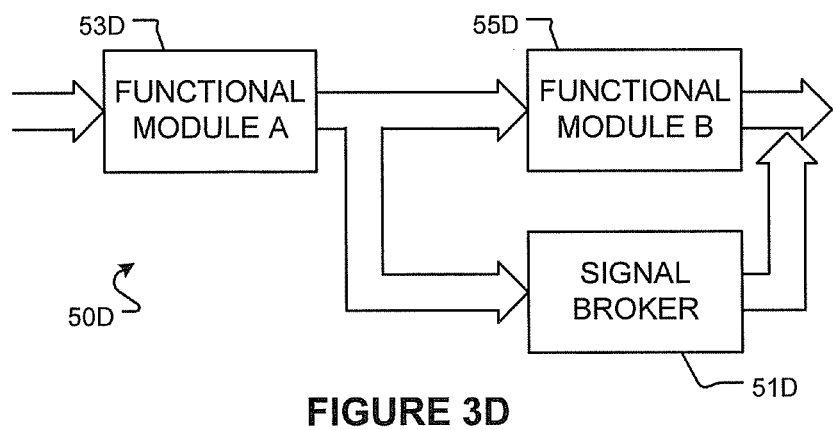

In FIG. 3D, a signal broker 51D is connected at two interfaces along a control path 50D. Signal broker 51D is connected at a first interface between functional modules 53D and 55D and connected at a second interface to functional module 55D. Signal broker 51D is connected to observe signals at the first interface, but, in the FIG. 5D embodiment, cannot intercept signals passing between functional modules 53D and 55D over the first interface. Signal broker 51D is accordingly incapable of delaying, filtering or re-ordering signals passing between functional modules 53D and 55D over the first interface. Signal broker 51D is connected to inject signals at the second interface. Signal broker 51D may be configured to expand signal mappings at functional module 55D by, for example, upon observing one or more particular signals output from functional module 53D at the first interface, injecting an additional signal at the second interface. The observed signal from functional module 53D is mapped by functional module 55D to a first output signal at the second interface and mapped by signal broker 51D to an additional signal injected at the second interface. The observed signal from functional module 53D is thus re-mapped from the first output signal to the combination of the first output signal and the additional signal.

Figure 3E:
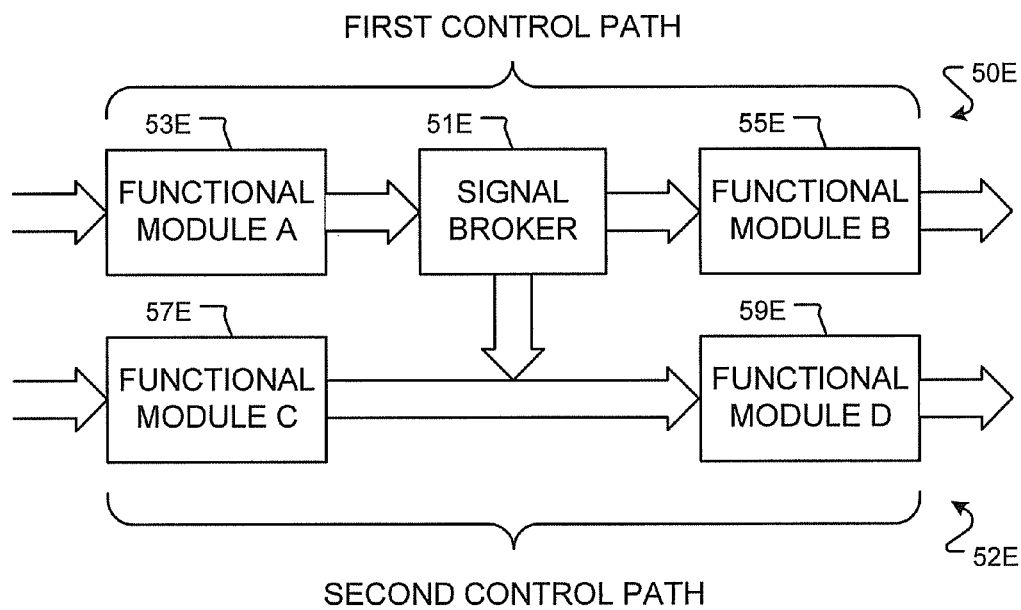

FIG. 3E provides an illustration of brokering of signals in a first control path based on signals in a second control path different from the first control path. In FIG. 3E, a signal broker 51E is connected at a first interface along a first control path 50E between functional modules 53E and 55E, and connected at a second interface along a second control path 52E between functional modules 57E and 59E. Signal broker 51E is interposed between functional modules 53E and 55E. In the absence of signal broker 51E functional modules 53E and 55E would be connected to a common interface. Signal broker 51E may be configured to expand signals mappings at functional module 55E of control path 50E in the manner that signal broker 51A may be configured to expand signals mappings at functional module 55A, for example. Signal broker 51E may also be configured to expand signal mappings at the first interface by, for example, upon observing one or more particular signals output from functional module 53E at the first interface along first control path 50E, injecting an additional signal at a second interface along second control path 52E. The observed signal from functional module 53E may be mapped by functional module 55E to a first output signal and mapped by signal broker 51E to an additional signal that is injected at the second interface and becomes input to functional module 59E. The observed signal from functional module 53E is thus re-mapped from the first output signal on first control path 50E to the combination of the first output signal on first control path 50E and the additional signal injected into second control path 52E. It will be appreciated that the signals observed by signal broker 51E at the first interface may be of a different type than the signals injected by signal broker 51E at the second interface. For example, the signals at the first interface may comprise protocol messages and the signals injected at the second interface may comprise function calls in an application executing on a controller.

Figure 3F:
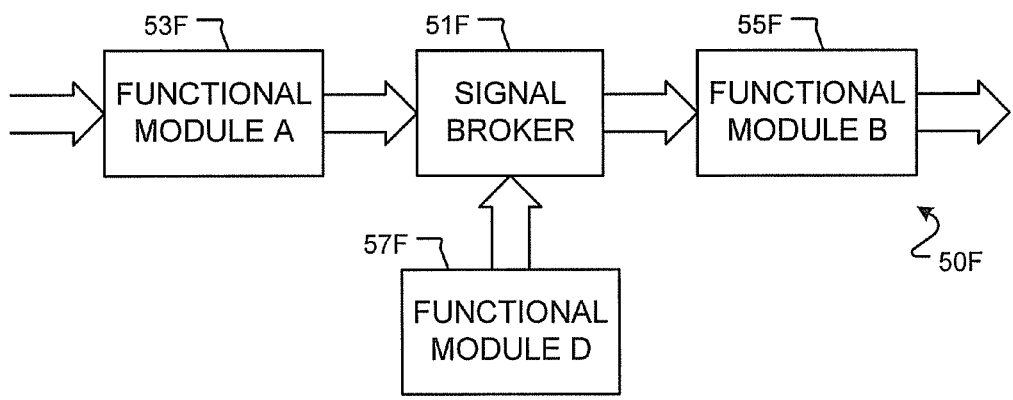

In FIG. 3F, a signal broker 51F is connected at an interface along a control path 50F between functional modules 53F and 55F and is also connected to functional module 57F. Signal broker 51F is interposed between functional modules 53F and 55F. In the absence of signal broker 51F functional modules 53F and 55F would be connected to a common interface. Signal broker 51F is configured to obtain state and/or event information from function module 57F. Functional module 57F may comprise a facility provided by an operating system of a personal communications device for providing system state information and/or event notifications, for example. Signal broker 51F may be configured to expand signals mappings at functional module 55F based on signals observed at the interface to which signal broker 51F is connected and on state and/or event information obtained from functional module 57F.

FIGS. 3A-3F show example implementations of signal brokering. Signal brokering may be implemented using combinations and subcombinations of the topologies shown in FIGS. 3A-3F. Signal brokering may be implemented using other topologies not shown in FIGS. 3A-3F.

Though FIGS. 3A-3F show unidirectional control paths, it will be appreciated that signal brokering may be performed using signals passing in more than one direction along a control path. For example, brokering of signals passing in a first direction along a control path may be based on signals passing in the first direction and/or in another direction different from the first direction. It will also be appreciated that though FIGS. 3A-3F show signal brokering based on signals at interfaces between functional modules, signal brokering may be performed at an edge interface, such as, for example, a LAN interface connected to a LAN interface module or a WAN interface connected to a WAN interface module.

It will further be appreciated that though FIGS. 3A-3F show signal brokers implemented as discrete functional modules inserted into control paths and separate from the other functional modules of the control paths, signal brokers may be implemented as two or more discrete functional modules, as replacements for one or more previously existing functional modules, and/or by modifying previously existing functional modules to implement signal brokering functionality.

Brokering may be implemented in a personal communications device in hardware, software and/or firmware. For example, signal brokering may be implemented on a suitably configured (e.g., programmed) controller. In some embodiments, at least some aspects of the behavior of a signal broker are user-configurable.

In some embodiments, brokering is implemented by binding a signal broker to a functional module of a personal communications device. In some embodiments, brokering is implemented by reconfiguring the bindings of connected functional modules, such that the signal broker is bound between the functional modules. A signal broker may be bound to a functional module implemented in the controller at compile time and/or at run time.

For example, in an example embodiment implemented in the Windows CE operating system, brokering may be implemented by binding an alternative AT Command Extension Module (DLL) module to the Bluetooth™ Audio Gateway Service (btagsvc.dll) in place of the default AT Command Extension Module by modifying the Windows registry entry for the Bluetooth™ Audio Gateway Service extension module (e.g. HKLM\Software\Microsoft\Bluetooth\AudioGateway "BTAGExtModule"). With the alternative module installed and registry suitably modified, when the operating system loads, the services.exe application loads system service modules, including the Bluetooth™ Audio Gateway Service (btagsvc.dll), and upon loading the Bluetooth™ Audio Gateway Service examines the registry entry for the names of its extension modules, which will include the alternative AT Command Extension Module. The alternative AT Command Extension Module will receive Bluetooth™ Hands Free Profile AT commands from the Bluetooth™ Audio Gateway Service, and can perform signal brokering on them, such as by forwarding them to the default AT Command Extension Module, discarding them, injecting alternative commands to the default AT Command Extension Module and/or injecting signals at other facilities available through the operating system (e.g., APIs).

Signal brokering may be implemented at an interface at which messages are exchanged according to a communication protocol. Where brokering is implemented at such an interface, the brokered signals comprise messages formatted and exchanged by functional modules according to pre-defined rules of the communication protocol. For instance, brokering may be implemented at an interface in a communications protocol stack.

Where brokering is implemented at an interface at which messages are exchanged according to a communication protocol, the signals (messages) that the broker injects at the interface, and the manner in which it injects them (e.g., as regards sequencing, timing, and the like) conform to the communication protocol. However, the signals injected by brokering may be outside the space of the input signals ordinarily passing over the interface. For example, brokering may be implemented at an interface connected to an input of a Bluetooth™ Hands Free Profile on a WLAN-WWAN device that receives Bluetooth™ Hands Free Profile commands from an associated WLAN device, which is configured to be capable of transmitting only the Table I Bluetooth™ Hands Free Profile commands (i.e. ATA (receive an incoming call), AT+CHUP (terminate call in-progress) and AT+BLDN (redial the previously dialed number)). In an embodiment according to this example, brokering may re-map some pattern of Bluetooth™ Hands Free Profile commands that can be generated by the WLAN device to one or more Bluetooth™ Hands Free Profile commands (i.e., one or more ™Hands Free Profile commands that cannot normally be generated by the WLAN device), such as, for example an ATdd . . . dd command (dial specified phone number).

Figure 4:
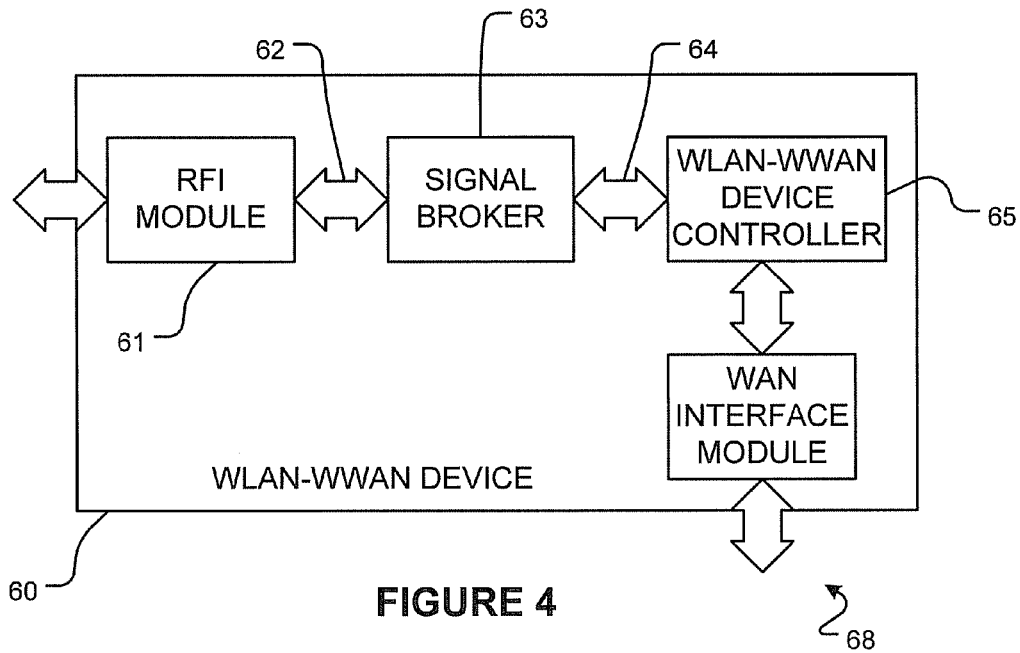
FIG. 4 is a block diagram of WLAN-WWAN devices comprising a control path and a signal broker along the control path according to an example embodiment.
Figure 5:
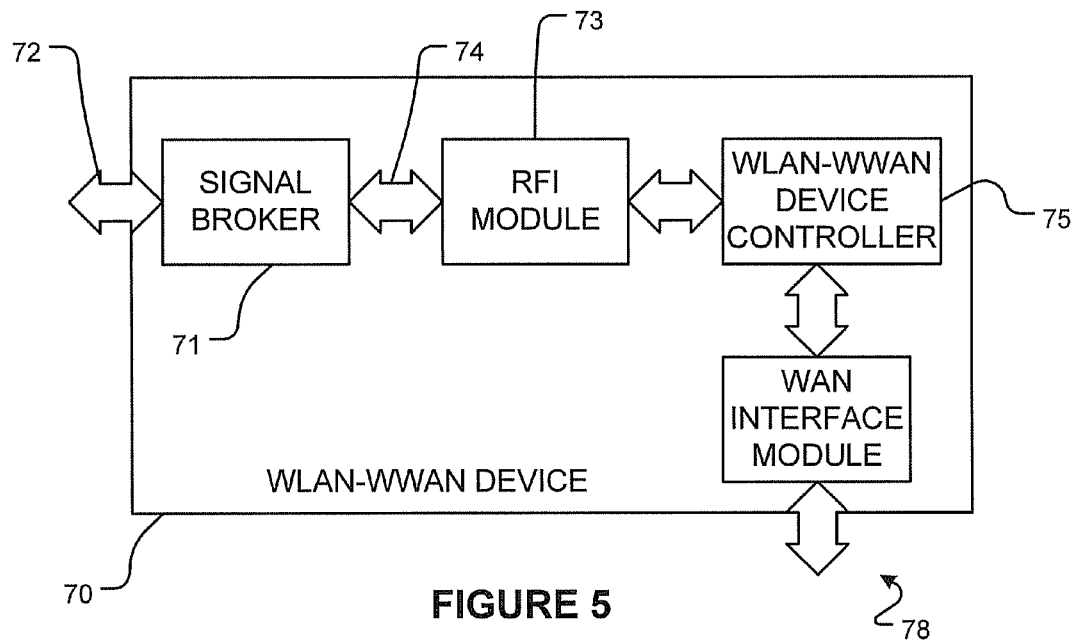
FIG. 5 is a block diagram of a WLAN-WWAN device comprising a control path and a signal broker along the control path according to an example embodiment.

FIGS. 4 and 5 are block diagrams of example WLAN-WWAN devices 60 and 70 showing, respectively, the example locations of signal brokers 63 and 71 along control paths 68 and 78. In FIG. 4, signal broker 63 is interposed between LAN-WAN device controller 65 and RFI module 61. Signals output from RFI module 61 are be received at signal broker 63 along path 62. In an example embodiment, broker 63 may broker signals inbound to it along path 62, for example, by filtering signals inbound along path 62 such that they do not pass outbound along path 64, injecting one or more additional or alternative signals along either or both of path 62 or path 64, or doing a combination of these. Signals output from LAN-WAN device controller 65 are received by signal broker 63 in a reverse direction along path 64. Broker 63 may broker signals inbound to it along path 64. For example, broker 63 may filter signals inbound along path 64 such that they do not pass outbound along path 62, inject one or more alternative or additional signals along either or both of path 62 or path 64, or do a combination of these.

In FIG. 5, signal broker 71 is interposed between RFI module 73 and a LAN interface of LAN-WAN device 70. A signal entering WLAN-WWAN device 70 over the LAN interface along path 72 is received by signal broker 71. In an example embodiment, broker 71 may broker signals inbound along path 72 by filtering them so that they do not pass outbound along path 74, injecting one or more additional or alternative signals along either or both of path 72 or path 74, or doing a combination of these. Broker 71 may also broker signals inbound to it from RFI module 73 in a reverse direction along path 74. For example, broker 71 may broker signals inbound along path 74 by filtering them such that they do not pass outbound along path 72, injecting one or more additional or alternative signals along either or both of path 72 or path 74, or doing a combination of these.

Figure 6:
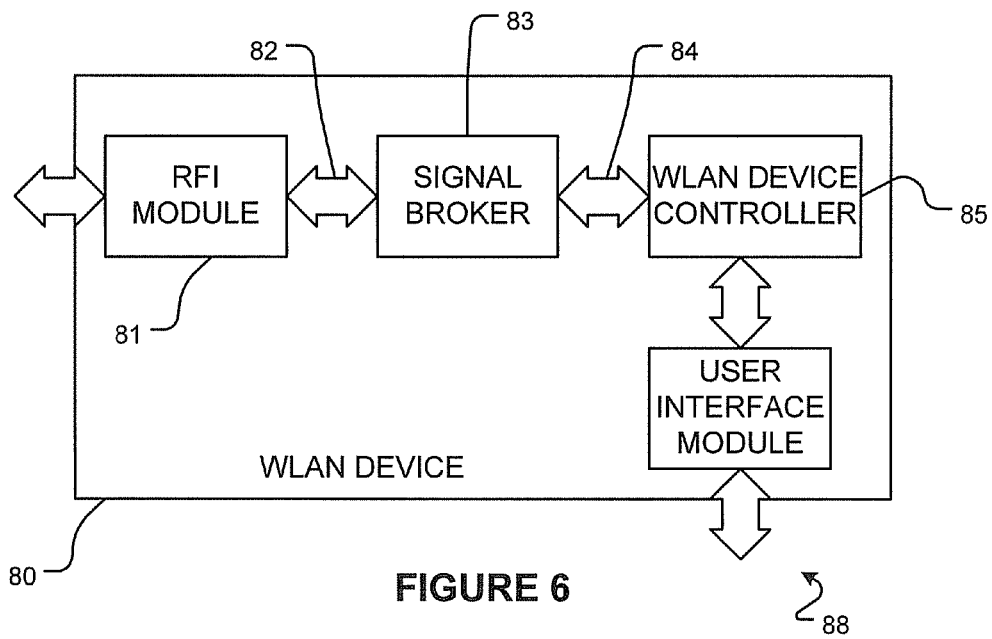
FIG. 6 is a block diagram of a WLAN device comprising a control path and a signal broker along the control path according to an example embodiment.
Figure 7:
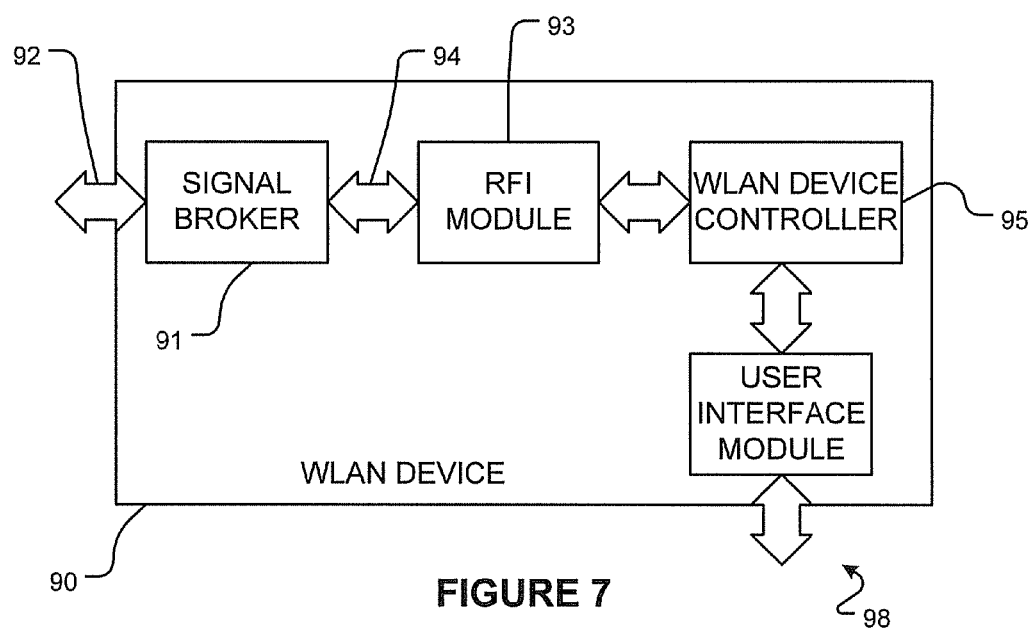
FIG. 7 is a block diagram of a WLAN device comprising a control path and a signal broker along the control path according to an example embodiment.

FIGS. 6 and 7 are block diagrams of example WLAN devices 60 and 70 showing, respectively, the example locations of brokers 83 and 91 along control paths 88 and 98. In FIG. 6, signal broker 83 is interposed between RFI module 81 and LAN device controller 85. In an example embodiment, broker 83 brokers signals inbound to it along path 82 by filtering them such that they do not pass outbound along path 84, injecting one or more alternative or additional signals along either or both of path 82 or path 84, or doing a combination of these. Signals output from LAN device controller 85 pass into signal broker 83 along path 84. Broker 83 may broker signals inbound to it along path 84. For example, broker 83 may filter signals inbound along path 84 such that they do not pass outbound along path 82, inject one or more alternative or additional signals along either or both of path 82 or path 84, or do a combination of these.

In FIG. 7, signal broker 91 is interposed between RFI 93 and a LAN interface of LAN device 90. A signal entering WLAN device over the LAN interface along path 92 is received by signal broker 91. In an example embodiment, broker 91 brokers signals inbound along path 92 by selectively selectively filtering them such that they do not pass outbound along path 94, injecting one or more different signals along either or both of path 92 or path 94, or doing a combination of these. Broker 91 may also broker to signals inbound to it from RFI module 93 in a reverse direction along path 94. For example, broker 91 may broker signals inbound along path 94 by filtering them such that they do not pass outbound along path 92, injecting one or more alternative or additional signals along either or both of path 92 or path 94, or doing a combination of these.

Figure 8:
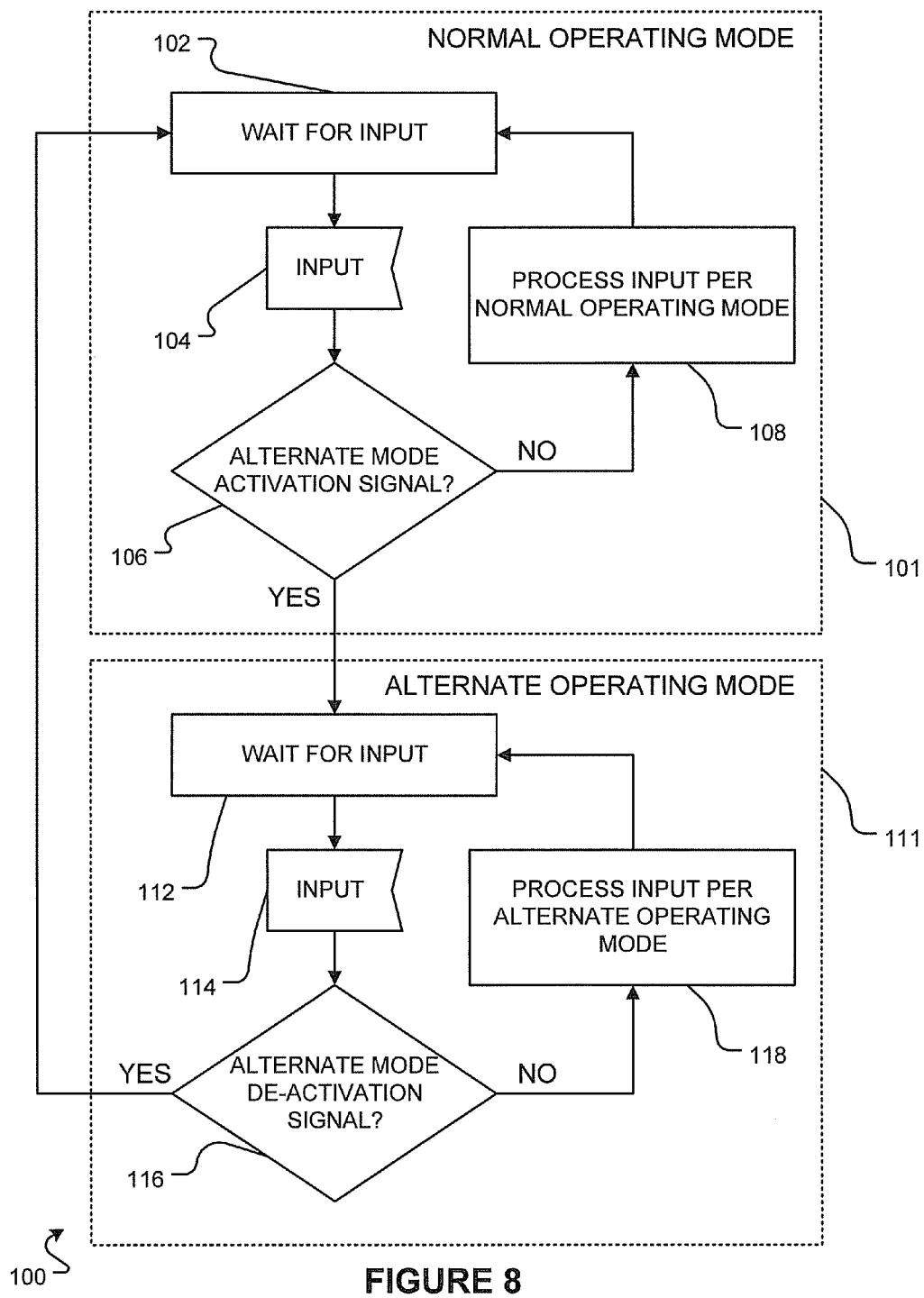
FIG. 8-10 are flowcharts of methods according to various example embodiments.

In some embodiments, signal brokering may implement expanded signal mappings using the concept of operating modes. FIG. 8 shows a flowchart of a method 100 according to an example embodiment which comprises a normal operating mode 101 and an alternate operating mode 111. Method 100 may be implemented in a signal broker and/or a controller configured to perform signal brokering, for example.

Normal operating mode 101 comprises wait for input state 102. Input 104 is checked at decision 106 as to whether input 104 comprises a signal satisfying an alternate operation mode activation criterion (e.g. matching a signal pattern or otherwise satisfying an alternate operation mode activation criterion). If input 104 does not comprise a signal satisfying an alternate operation mode activation criterion (block 106 NO output), input 104 is processed 108 according to procedures defined for normal operating mode 101. Where a signal broker is implemented as a discrete module interposed functional modules that previously shared a common interface, procedures defined for normal operating mode may comprise forwarding input 104 without modification. If input 104 comprises a signal satisfying an alternate operation mode activation criterion (block 106 YES output), there is a transition to alternate operating mode 111. The signal satisfying an alternate mode activation criterion may be discarded, passed onward without modification, or processed in alternate operating mode 111. To the extent that input 104 includes information in addition to the signal satisfying an alternate mode activation criterion, then the relevant portion of input 104 may be processed in an optional processing block (not shown) between the block 106 YES output and alternate operating mode 111.

Alternate operating mode 111 comprises wait for input state 112. Input 114 is checked at decision 116 as to whether in comprises a signal satisfying an alternate operation mode de-activation criterion. If input 114 does not comprise a signal satisfying an alternate operating mode de-activation criterion (block 116 NO output), input 114 is processed at block 118 according to procedures defined for alternate operating mode 111. Such procedures may comprise alternate mode mappings of signals to outputs, which may comprise filtering, delaying, reordering and/or injecting new additional or alternative signals. If input 114 comprises a signal satisfying an alternate operation mode de-activation criterion (block 116 YES output), there is a transition to normal operating mode 101. The signal satisfying an alternate mode de-activation criterion may be discarded, passed onward without modification, or processed in normal operating mode 101. To the extent that input 114 includes information in addition to the signal satisfying an alternate mode de-activation criterion, then the relevant portion of input 114 may be processed in an optional processing block (not shown) between the block 116 YES output and normal operating mode 101.

Alternate operating mode activation and/or de-activation criteria may comprise a pattern of signals, including pattern defined, in whole or in part, by temporal signal information and/or sequential signal information. A signal may satisfy an alternate operating mode activation or de-activation criterion comprising a pattern of signals, in whole or in part, by matching the pattern. Where brokering is implemented at an interface at which messages are exchanged according to a communication protocol, an alternate operating mode activation and/or de-activation criteria may comprise a pattern of messages formatted and exchanged by components according to pre-defined rules of the communication protocol.

Where brokering is implemented in a system comprising a limited input user interfaces, alternate operating mode activation and de-activation criteria may comprise patterns of signals that may be generated as a result of user input provided to the limited input user interface. By way of non-limiting example, an alternate operating mode activation criterion may comprise a sequence of a signals generated as a result of a particular user input being entered a specified number of times within a specified period of time. In some embodiments, activation criteria and de-activation criteria may be the same. In other embodiments these activation/de-activation criteria may be different. Alternate mode activation and/or de-activation criteria may be user configurable.

Figure 9:
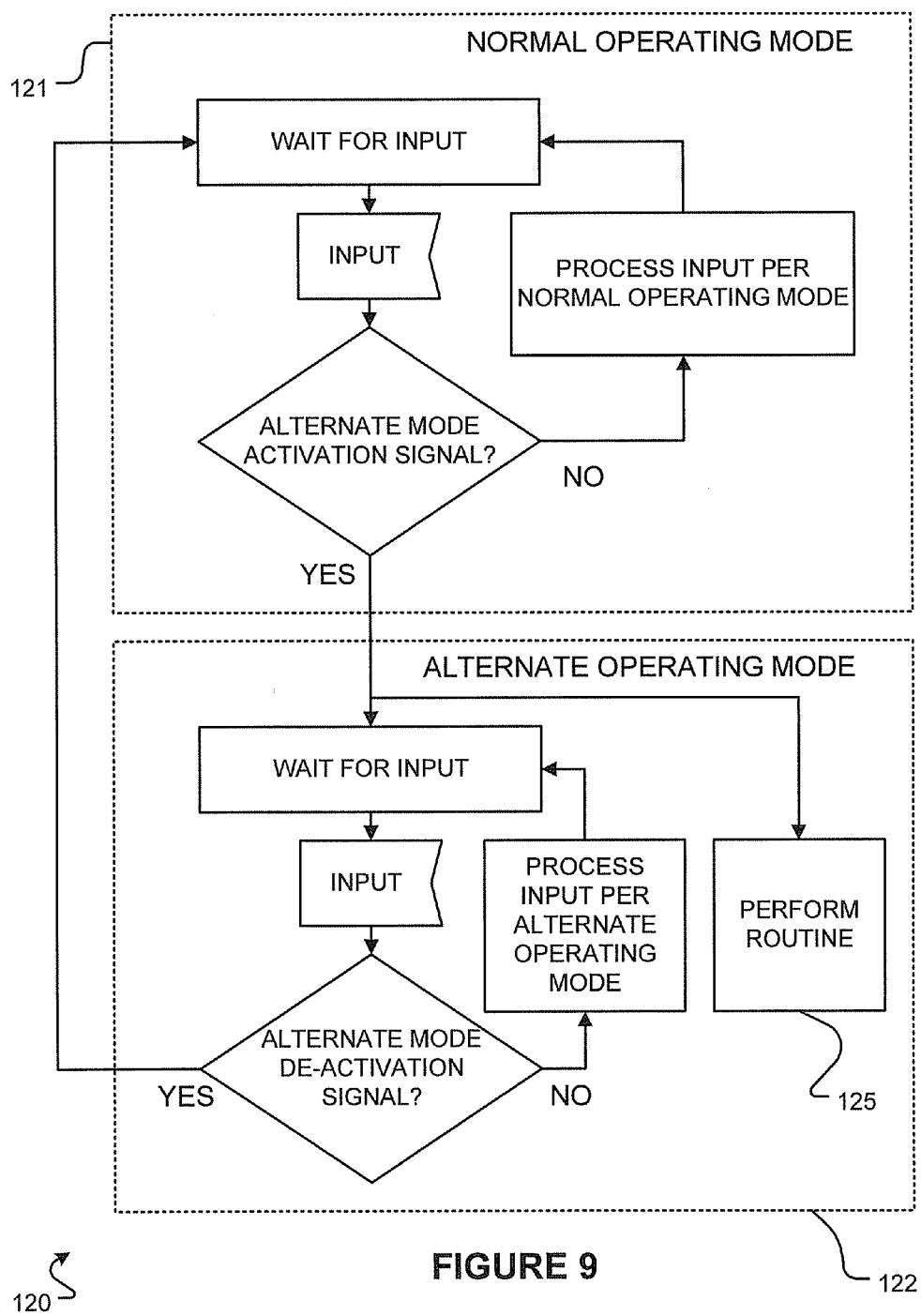

FIG. 9 shows a flowchart of a method 120 according to another example embodiment comprising normal operating mode 121 and alternate operating mode 122. Method 120 may be implemented in a signal broker and/or a controller configured to perform signal brokering, for example. Method 120 (FIG. 9) differs from method 100 (FIG. 8) in that alternate operating mode 122 comprises alternate mode routine 125. Alternate mode routine 125 may be performed upon transition from normal operating mode 121 to alternate operating mode 122. An alternate mode routine may comprise, for example, injecting a plurality of signals into one or more control paths. An alternate mode routine may be implemented by a state machine, the operation of which may depend on signals observed at interfaces along control paths, device state information, device event information, timers, and/or the like. It will be appreciated that a second alternate mode routine (not shown) may also be performed upon a transition from alternate operating mode 122 to normal operating mode 121. The second alternate mode routine may be the same or different from alternate mode routine 125.

Some embodiments of the invention comprise methods having more than two operating modes (i.e., operating modes in addition to a normal operating mode and an alternate operating mode of the above-described embodiments). Transitions from one mode to one of several other operating modes may be possible. Transitions between operating modes may be reciprocal or unidirectional. Transitions between operating modes may be initiated by signals satisfying one of two or more different mode activation criteria. Transitions between operating modes may be initiated in response to device state and/or event information, alone or in combination with a signal satisfying a mode activation critera. Transitions between operating modes may be initiated in response to expiry of a timer or the like.

Signals satisfying mode activation criteria and/or mode de-activation criteria may be detected by a mode controller (not shown) disposed at one or more interfaces along a control path. A mode controller may be co-located or integrated with a signal broker, or may be located apart from a signal broker. A mode controller may be implemented in a suitably configured controller, for example.

The use of normal and alternate operating modes can be adapted to facilitate emergency communications functionality in systems comprising WLAN devices and WLAN- WWAN devices. Signal brokers may be used to facilitate emergency communications functionality by implementing suitable expanded signal mappings. For example, an alternate operating mode activation criterion may comprise an emergency mode activation criterion, and an alternate operating mode may comprise an emergency mode.

An emergency mode may comprise an emergency routine (e.g. as a part of the block 125 routine and/or the block 118 processing). An emergency routine may comprise injecting a signal configured to initiate an emergency communication over a WAN. By way of non-limiting example an emergency routine may comprise one or more of: establishing an audio connection between the LAN device and an associated WLAN-WWAN device, auto-dispatching SMS alerts to one or more emergency contacts, continuously automatically attempting to establish telephone calls with one or more emergency contacts, auto-sending emails to one or more emergency contacts, communicating with an emergency response dispatch center (e.g., establishing a telephone call with a 9-1-1 emergency response dispatch center), indicating to the user that emergency mode has been activated, combinations thereof, or the like. In some embodiments, each of a plurality of emergency modes may comprise a different emergency routine.

In some embodiments, emergency routines may be user-configurable. For example, a user may configure a signal broker and/or a controller with an ordered list of emergency contacts to be contacted in an emergency. In some embodiments, a user may configure a signal broker and/or a controller with an order of operations to be performed in an emergency mode routine (e.g. phone a first emergency contact, then phone 911, then send email to a plurality of emergency contacts).

An emergency mode may comprise procedures for processing signals, which procedures differ from the procedures for processing signals in a normal operating mode. For example, in emergency mode, a personal communications device may ignore incoming calls that are not from a correspondent on a list of authorized correspondents. Authorized correspondents may include, for example, emergency contacts, emergency services centers, and the like. In some embodiments, procedures for processing signals in an emergency operating mode are user configurable.

Inputs received while in emergency mode may impact an emergency routine. For example, an emergency routine may repeatedly attempt to establish contact with one or more emergency contacts until an input indicative of establishment of contact with one of the emergency contacts is received. Similarly, an emergency routine may repeatedly dispatch SMS messages to one or more emergency contacts until a reply SMS message is received from one of the emergency contacts.

Figure 10:
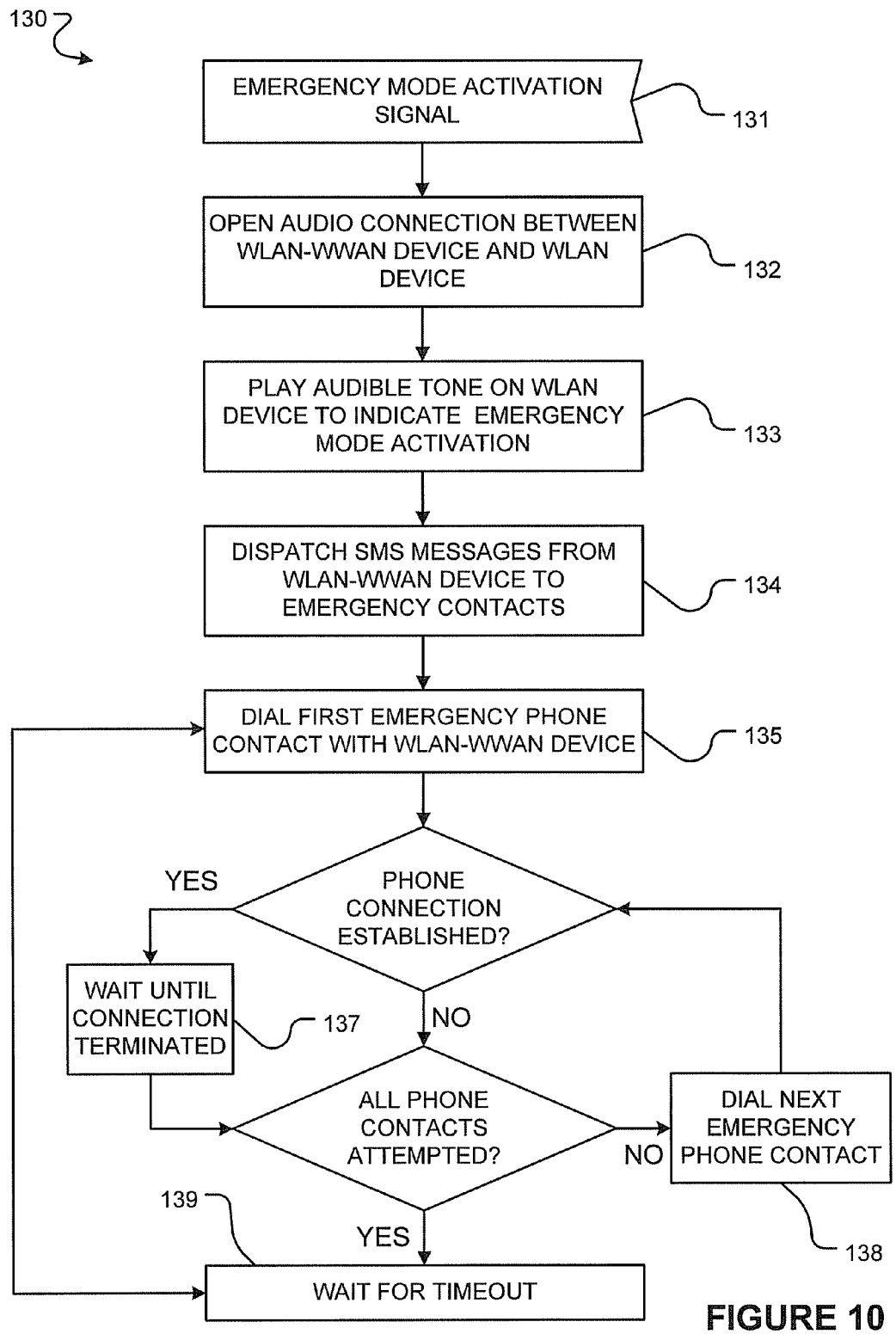

FIG. 10 shows a flowchart of a method 130 in an emergency routine according to an example embodiment. Emergency mode method 130 may be implemented on a signal broker and/or a controller configured to perform signal brokering, for example, in a system comprising a WLAN device and a WLAN-WAN device. For instance, emergency mode method 130 may be implemented on a signal broker and/or a suitably configured controller of a Bluetooth™-enabled mobile phone that is associated with a Bluetooth™ headset.

Emergency mode method 130 is initiated by a signal 131 satisfying an emergency mode activation criterion. Emergency mode method 130 may be implemented as part of an alternate mode routine 125, as part of block 118 processing, or as some combination thereof. Upon receiving the signal 131 satisfying the emergency mode activation criterion, an audio connection is established in block 132 between the WLAN-WWAN device and the WLAN device, if such a connection does not already exist. In block 133, a tone is played out by the WLAN to confirm to the user that a signal satisfying the emergency mode activation criterion has been received. After the block 133 emergency mode activation confirmation, method 130 proceeds to block 134 in which the WLAN-WWAN device dispatches SMS messages to SMS emergency contacts. The SMS emergency contacts used in block 134 may be stored in the WLAN device, the WLAN-WWAN device, or another place accessible to the signal broker and/or controller on which method 130 is implemented. The block 134 SMS messages may comprise an identification of the user, a time at which the emergency alert was activated, an indication of the nature of the emergency, and/or the location of the WLAN device and/or the WLAN-WWAN device. In some embodiments, block 134 SMS messages are retransmitted to SMS emergency contacts from whom an acknowledgment is not received within a timeout. In some such embodiments, the timeout and/or the number of retransmissions may be user-configurable.

After the block 134 SMS messages are dispatched, method 130 proceeds to block 135 in which the WLAN-WWAN device dials the phone number of the first emergency contact in a phone emergency contact list. The block 135 phone emergency contact list may be user-configurable. The phone emergency contact list may be stored in the WLAN device, the WLAN-WWAN device, or another place accessible to the signal broker and/or controller on which method 130 is implemented. The phone emergency contact list may comprise one or more of the block 134 SMS emergency contacts. If a phone connection is established (block 136 YES output), there is a wait in block 137 until the connection is terminated, after which, if all of the numbers in the phone emergency contact list have not already been dialed, method 130 proceeds to block 138 in which the WLAN-WWAN device dials the next phone number of the phone emergency contact list. If a phone connection was not established with the first number (block 136 NO output)—e.g., because the numbered dialed was busy or the call was not answered—and there are more phone numbers in the list, then method 130 proceeds to block 138 which involves dialing the next phone number of the phone emergency contact list. The cycle of dialing phone numbers and establishing connections is repeated until the emergency phone list is exhausted, at which point there is a wait in block 139 for a timeout. After the block 139 timeout expires, method 130 returns to block 135 where all of the phone numbers are tried again, starting with the first number. In some embodiments, the block 139 timeout is user-configurable.

In some embodiments, re-dialing of numbers may depend on the reason why connections were not established when the numbers were previously tried. For example, numbers that were busy may be re-dialed before numbers for which no answer was received.

Several other optional behaviors may be implemented in emergency mode, including, by way of non-limiting example:
  Incoming calls are not accepted if a call is already in progress. If no call is in progress, an incoming calls is accepted only if caller ID indicates that the call if from a member of the phone emergency contact list.
  Upon receiving an emergency mode de-activation signal, de-activation of the emergency mode is announced to the user via the WLAN device, emergency mode is exited, and control returns to normal operating mode. Selected user inputs may be ignored.

In some embodiments, an emergency activation criterion may comprise a signal that may be generated in response to information from one or more sensors, such as, for example,
- an accelerometer;
- a GPS receiver;
- a thermometer;
- a physiological measurement apparatus (e.g., a heart rate monitor, a respiration monitor, or the like); and/or
- the like.

In some embodiments, such sensors may be part of or in communication with a WLAN device, such as a handsfree device. The WLAN device may be configured to stream data from a sensor to a controller located on the WLAN-WWAN device. Alternatively, both the sensor as well as the controller configured to interpret the sensor data may exist on the WLAN device.

In some embodiments, a signal broker and/or a controller in a WLAN device or a WLAN-WWAN device is configured to enter an emergency mode upon the detection of sensor data that indicates that the user is subject to an emergency condition, such as, for example, sensor data that indicates that the user has fallen, been inactive for a period of time, suffered a deleterious change in physiological condition, strayed outside of a defined geographic area, been subject to excessively hot or cold temperatures for more than a threshold period of time, or the like. For example, a signal broker and/or a controller in a WLAN device or a WLAN-WWAN device may be configured to enter an emergency mode if a spike in acceleration followed by a period of lesser activity is detected, and/or if a period of inactivity greater than a threshold duration is detected. Criteria for detecting emergency conditions may be based, at least in part, on time of day data. Emergency detection conditions, such as sensor data thresholds, time durations, geographical boundaries, and time-of-day criteria may be user-configurable.

In some embodiments, a WLAN device comprises a sensor coupled to logic (such as in a controller) configured to inject a signal satisfying an emergency mode activation criterion into a control path upon detecting sensor data indicative of an emergency condition. WLAN device according to such embodiments may be associated with a WLAN-WWAN device comprising a signal broker along the control path configured to enter an emergency mode upon observing the injected signal satisfying the emergency mode activation criterion. The control path may comprise a control path configured to carry signals generated in response to user input, for example.

Figure 11:
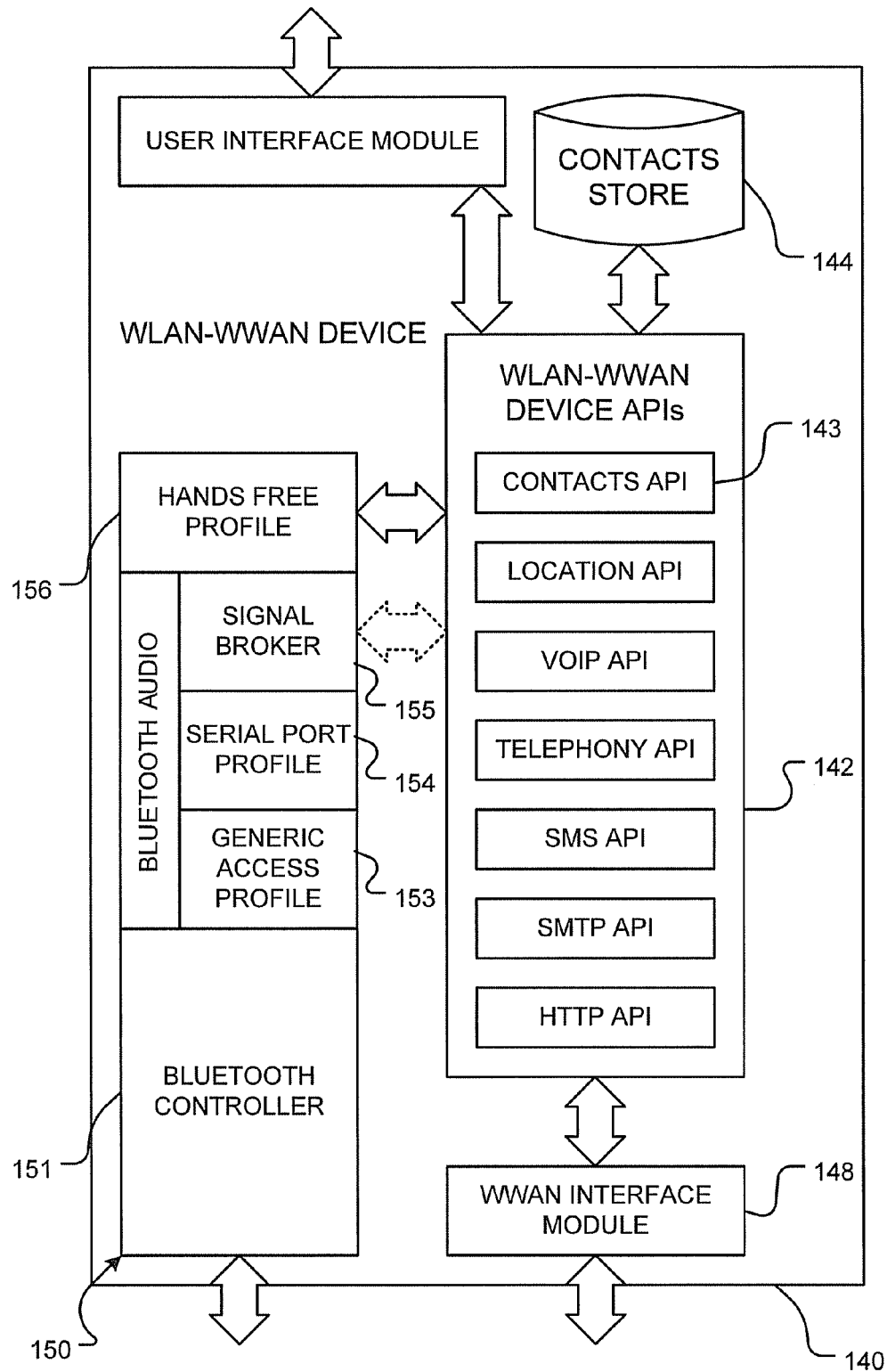
FIG. 11 is a block diagram of a LAN-WAN device according to an example embodiment.

FIG. 11 is a block diagram of a WLAN-WWAN device 140 according to an example embodiment. WLAN-WWAN device 140 may comprise a mobile phone, a personal digital assistant, or the like. WLAN-WWAN device 140 comprises several application programming interfaces (APIs) 142. APIs 142 include a simple mail transport protocol (SMTP) API, a Voice Over Internet Protocol (VOIP) API, a telephony API, a short message service (SMS) API, a location API and a hypertext transport protocol (HTTP) API. In other embodiments, APIs 142 could include a subset of the FIG. 11 APIs 142 or additional APIs not included in the FIG. 11 embodiment. Contacts API 143 provides access to a contact store 144. At least some of APIs 142 are configured to facilitate interaction with WWAN interface module 148 (e.g., at least some of APIs 142 may be part of one or more WAN control paths). WLAN-WWAN device 140 also comprises a Bluetooth™ stack 150. In the illustrated embodiment, Bluetooth™ stack 150 comprises a Bluetooth™ controller 151, a generic access profile 153, a serial port profile 154, and a hands-free profile 156. Bluetooth™ controller 151 comprises a WLAN interface. Hands-free profile 156 may interact with one or more WLAN-WWAN device APIs 142.

In the illustrated embodiment, a signal broker 155 is interposed between serial port profile 154 and hands-free profile 156 and is configured to broker Bluetooth™ Hands Free Profile commands passing between serial port profile 154 and hands-free profile 156. As discussed above, signal broker 155 may provide expanded uni-directional and/or multi-directional signal mapping of Bluetooth™ Hands Free Profile commands between hands-free profile 156 and serial port profile 154. In some embodiments, signal broker 155 may interact with one or more WLAN-WWAN device APIs 142. Signal broker 155 may have been installed on WLAN-WWAN device 140 as an addition to the "stock" configuration of WLAN-WWAN device (e.g., WLAN-WWAN device 140 may have been sold without signal broker 155, and an end-user may have installed signal broker 155).

In normal operating mode, WLAN-WWAN device 140 may serve as a communication bridge between a WLAN device (e.g., a Bluetooth™ headset) and a WWAN (e.g., a cellular telephone network). While normal operating mode prevails, signal broker 155 may monitor (i.e., without altering) messages passing between serial port profile 154 and Hands Free Profile 156. When signal broker 155 observes a signal satisfying an emergency mode activation criterion (e.g. a designated pattern of messages passing between serial port profile 154 and Hands Free Profile 156), signal broker 155 enters an emergency operating mode and may initiate an emergency routine.

The emergency mode activation criterion may comprise a pattern of signals that may be matched by signals generated in response to a corresponding pattern of user input entered at the WLAN device. For example, if while the WLAN device is in an idle state two successive presses of a particular button on a user interface of the WLAN device cause AT+BLDN=1 (enable voice recognition) and AT+BLDN=0 (disable voice recognition) commands to be transmitted in sequence from the Hands Free Profile of the WLAN device to the Hands Free Profile of the WLAN-WWAN device, an emergency mode activation criterion may comprise a pattern comprising a sequence of an AT+BLDN=1 command and an AT+BLDN=0 command occurring within a 2 second time window. In an embodiment according to this example, signal broker 155 observes a signal satisfying this emergency mode criterion when it observes an AT+BLDN=1 command and an AT+BLDN=0 command within a 2 second time window.

The emergency routine may comprise signal broker 155 injecting Bluetooth™ Hands Free Profile commands into Hands Free Profile 156. Bluetooth™ Hands Free Profile commands injected into Hands Free Profile 156 may comprise commands which cannot be generated by the WLAN device (not shown) that generated the commands which constituted the emergency mode activation signal. For example, the WLAN device may be configured to be capable of transmitting only the Table I Bluetooth™ Hands Free Profile commands (i.e. ATA (receive an incoming call), AT+CHUP (terminate call in-progress) and AT+BLDN (redial the previously dialed number)). In an embodiment according to this example, Bluetooth™ Hands Free Profile commands injected into Hands Free Profile 156 may comprise one or more Bluetooth™ Hands Free Profile commands that cannot normally be generated by the WLAN device, such as, for example an ATdd . . . dd command (dial specified phone number, i.e., a signal configured to initiate a communication over the wide area network, which communication is different from a communication that would have occurred in the absence of the injected alternate mode signal).

In some embodiments, the emergency routine comprises signal broker 155 interacting with one or more WLAN-WWAN device APIs 142. For example, signal broker 155 may be configured to inject signals at one or more WLAN-WWAN device APIs 142, which signals are configured to initiate an alternate communication over the wide area network. In some embodiments, signal broker 155 is configured to obtain information about the user's present circumstances (e.g., location, physiological condition, etc.) using a WLAN-WWAN device API 142, and to inject a signal configured to initiate a communication over the wide area network that contains the information about the user's present circumstances.

While in emergency mode, signal broker 155 may broker Bluetooth™ Hands Free Profile commands between serial port profile 154 and Hands Free Profile 156 in order to alter the responses of WLAN-WWAN device 140 to inputs arriving via Bluetooth™ stack 150 and/or WWAN interface 148. When signal broker 155 detects a signal satisfying an emergency mode de-activation criterion, it returns to normal operating mode.

Figure 12:
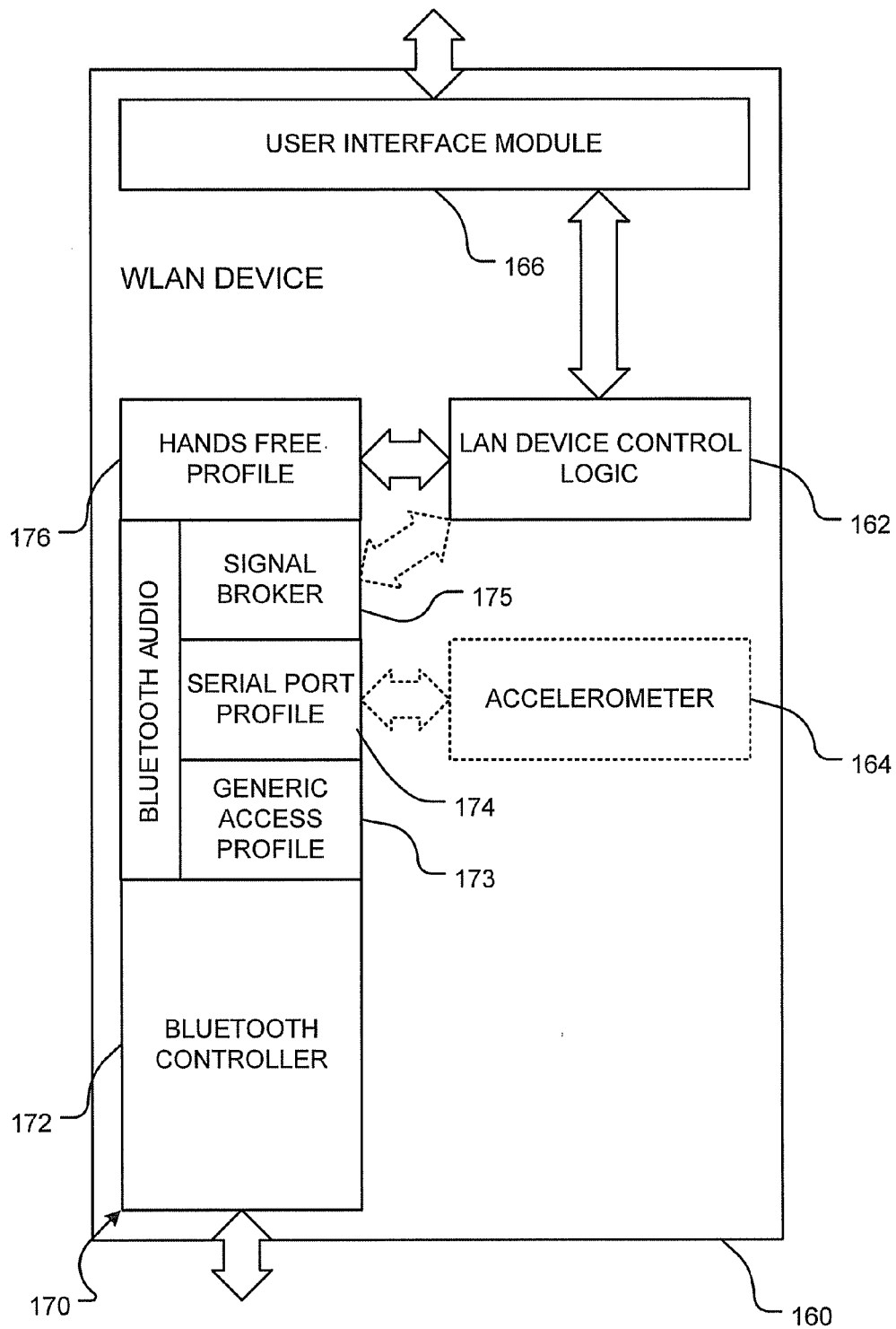
FIG. 12 is a block diagram of a LAN device according to an example embodiment.

FIG. 12 is a block diagram of a WLAN device 160 according to an example embodiment. WLAN device 160 may comprise a Bluetooth™ headset, a Bluetooth™ communicator, or the like. WLAN device 160 of the illustrated embodiment comprises control logic 162, an optional accelerometer 164 and a user interface module 166. WLAN device 160 comprises a Bluetooth™ stack 170. In the illustrated embodiment, Bluetooth™ stack 170 comprises a Bluetooth™ controller 172, a generic access profile 173, a serial port profile 174, and a hands-free profile 176. Hands-free profile 176 may interact with control logic 162. Signal broker 175 is interposed between Hands Free Profile 176 and serial port profile 174, and is configured to broker the passage of Bluetooth™ Hands Free Profile commands between Hands Free Profile 176 and serial port profile 174. As discussed above, signal broker 175 may provide expanded uni-directional and/or multi-directional mapping of Bluetooth™ Hands Free Profile commands between hands-free profile 176 and serial port profile 174. In some embodiments, signal broker 175 may interact with control logic 162.

Optional accelerometer 164 is configured to generate acceleration data for LAN device 160. In some embodiments, accelerometer 164 is configured to provide acceleration data to serial port profile 174, which is configured to forward the data to a WLAN-WWAN device (not shown) via Bluetooth™ stack 170 for detection of one or more acceleration-based emergency conditions (e.g., a fall). The WLAN-WWAN device may be configured to enter an emergency mode upon detecting an emergency condition in the acceleration data.

In some embodiments, accelerometer 164 provides acceleration data to control logic 162, and control logic 162 analyzes the data to detect one or more emergency conditions. In some such embodiments, control logic 162 is configured to cause Hands Free Profile 176 to generate a pattern of Bluetooth™ Hands Free Profile commands that satisfy an emergency mode activation criterion. In other such embodiments, control logic 162 is configured to cause signal broker 175 to enter an emergency mode.

In normal operating mode, WLAN device 160 may serve as an interface for a user to communicate with a WWAN (e.g., a cellular telephone network) via a WLAN-WWAN communication bridge (e.g., a mobile phone). While normal operating mode prevails, signal broker 175 may monitor (i.e., without altering) signals passing between Hands Free Profile 176 and serial port profile 174. When signal broker 175 detects a signal satisfying an emergency mode activation criterion (e.g. a designated pattern of Bluetooth™ Hands Free Profile commands passing between Hands Free Profile 176 and serial port profile 174, which may be generated by Hands Free Profile 176 in response to user input entered at user interface 166), signal broker 175 enters an emergency operating mode and may initiate an emergency routine.

The emergency routine may comprise injecting Bluetooth™ Hands Free Profile commands into serial port profile 174. Bluetooth™ Hands Free Profile commands injected into Hands Free Profile 176 may comprise commands which user input at interface module 166 cannot cause to be generated by the Hands Free Profile 176. For example, the user input may be configured to be capable of causing Hands Free Profile 176 to generate only the Table I Bluetooth™ Hands Free Profile commands (i.e. ATA (receive an incoming call), AT+CHUP (terminate call in-progress) and AT+BLDN (redial the previously dialed number)). In an embodiment according to this example, Bluetooth™ Hands Free Profile commands injected into Hands Free Profile 176 may comprise one or more Bluetooth™ Hands Free Profile commands that cannot normally be generated as a result of user input at interface module 166, such as, for example an ATdd . . . dd command (dial specified phone number). In some embodiments, the emergency routine comprises signal broker 175 interacting with control logic 162, such as by injecting signals into control logic 162, for example.

While in emergency mode, signal broker 175 may broker Bluetooth™ Hands Free Profile commands between serial port profile 174 and Hands Free Profile 176 in order to alter the responses of WLAN device 160 to inputs arriving via Bluetooth™ stack 170. When signal broker 175 detects an emergency mode de-activation signal, it returns to normal operating mode.

Figure 13:
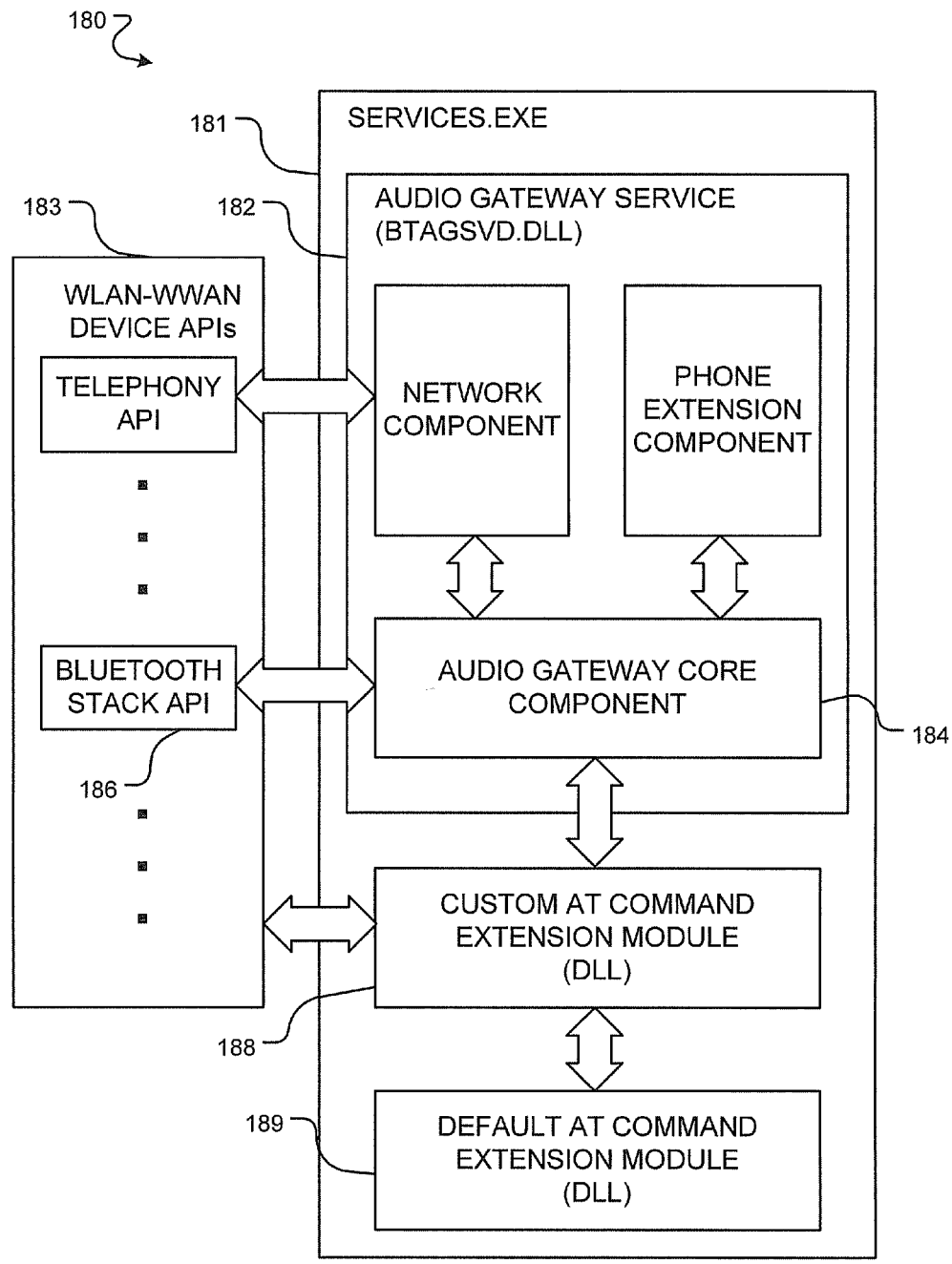
FIG. 13 is a block diagram of a signal brokering implementation according to an example embodiment on a WLAN-WWAN device.

FIG. 13 is a block diagram of a signal brokering implementation 180 according to an example embodiment on a WLAN-WWAN Bluetooth™ communications device running Microsoft Windows Mobile™ 6 and supporting the Windows Bluetooth™ stack. The SERVICES.EXE process 181 loads the Bluetooth™ Audio Gateway Service 182, which is implemented as BTAGSVC.DLL. Bluetooth™ Audio Gateway Service 182 comprises an Audio Gateway Core Component 184 that is in communication with a Bluetooth™ stack (not shown) via a Bluetooth™ stack API 186 of the device. Audio Gateway Core Component 184 is also in communication with a custom AT Command Extension module 188, which is implemented as a DLL. Custom AT Command Extension module 188 is bound to Audio Gateway Core Component 184 in place of a default AT Command Extension module 189. Custom AT Command Extension module 188 is bound to default AT Command Extension module 189, and thus is interposed between Audio Gateway Core Component 184 and default AT Command Extension module 189.

In operation, Bluetooth™ handsfree profile (HFP) AT commands received from an associated WLAN Bluetooth™ device (not shown) are passed through Bluetooth™ stack (not shown) via Bluetooth™ Stack API 186 to Audio Gateway Core Component 184. Audio Gateway Core Component 184 calls custom AT Command Extension module 188 to handle incoming Bluetooth™ HFP AT commands. Custom AT Command Extension module 188 is configured to broker Bluetooth™ HFP AT commands passed to it by Audio Gateway Core Component 184. For example, custom AT Command Extension module 188 may be configured to monitor Bluetooth™ HFP AT commands passed to it by Audio Gateway Core Component 184, and, after a delay, pass them to default AT command extension module 189. If custom AT Command Extension module 188 detects a sequence of received Bluetooth™ HFP AT commands that matches a pattern of Bluetooth™ HFP AT commands that constitute an emergency mode activation criterion (e.g. user-configurable or predetermined emergency mode activation criterion), a state machine (not shown) implemented in custom AT Command Extension module 188 may enter an emergency mode, and custom AT Command Extension module 188 may discard the received emergency mode activation sequence of Bluetooth™ HFP AT commands without passing them to default AT Command Extension module 189, inject one or more alternative Bluetooth™ HFP AT commands into default AT command extension module 189 according to an emergency routine, and inject one or more signals into one or more WLAN-WWAN Device APIs 183 (which may comprise any combination of the FIG. 11 APIs 142 or additional APIs not included in the FIG. 11 embodiment).

Figure 14:
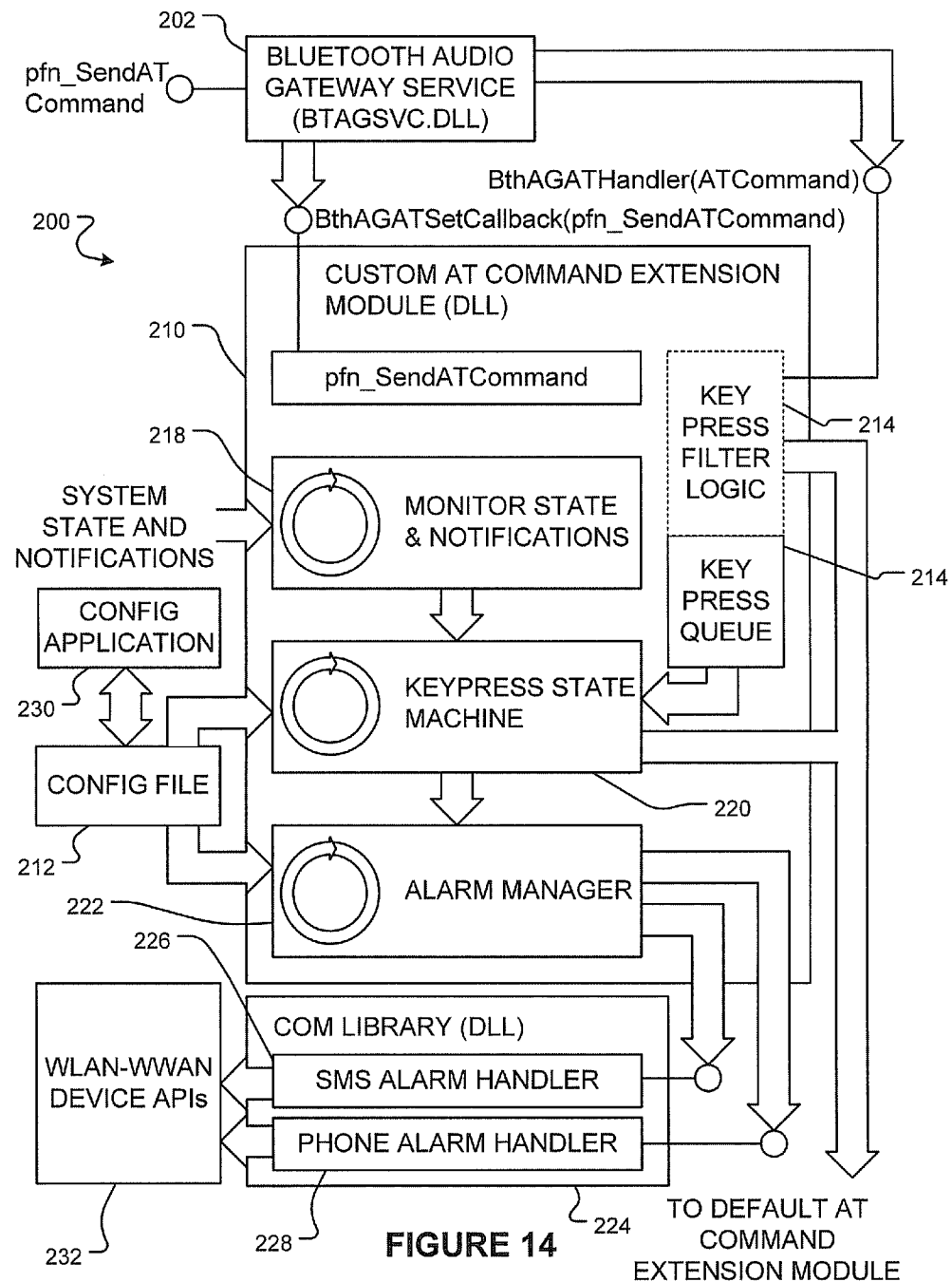
FIG. 14 is a block diagram of a signal brokering implementation according to an example embodiment on a WLAN-WWAN device.

FIG. 14 is a block diagram of an implementation 200 of signal brokering according to an example embodiment on a WLAN-WWAN Bluetooth™ communications device running Microsoft Windows Mobile™ 6 and supporting the Windows Bluetooth™ stack. In FIG. 14, paths of communications generated in response to messages incoming to a WLAN-WWAN device are shown, but return communication paths are not shown to avoid obscuring the explanation. In implementation 200, signal brokering is performed by a Custom AT Command Extension Module 210, an SMS alarm handler 226 and a phone alarm handler 228. Custom AT Command Extension Module 210 is bound to a Bluetooth™ Audio Gateway Service 202, which is implemented as BTAGSVC.DLL.

Bluetooth™ Audio Gateway Service 202 is loaded by the operating system of the WLAN-WWAN device. When a handsfree device becomes available, Bluetooth™ Audio Gateway Service 202 loads Custom AT Command Extension Module 210, and invokes the exported BthAGATSetCallback function of Custom AT Command Extension Module 210, passing the function a pointer to a callback function (pfn_SendATCommand) implemented in the Bluetooth™ Audio Gateway Service 202. Custom AT Command Extension Module 210 stores the function callback pointer for later use (e.g., for sending AT responses from the WLAN-WWAN device to an associated Bluetooth™ WLAN device, such as may be required to control the behaviour of an associated Bluetooth™ WLAN device (not shown) where commands from the associated Bluetooth™ WLAN device are re-mapped by Custom AT Command Extension Module 210, for example) and returns control to Bluetooth™ Audio Gateway Service 202.

Bluetooth™ Audio Gateway Service 202 is configured to receive Bluetooth™ HFP commands, including without limitation AT commands, from an associated Bluetooth™ WLAN device (not shown). Bluetooth™ Audio Gateway Service 202 passes received AT commands to Custom AT Command Extension Module 210 using the exported BthAGATHandler function. On the first invocation of the BthAGATHandler function, Custom AT Command Extension Module 210 performs an initialization routine that includes auto-generating a configuration file 212 if none is present, loading the Default AT Command Extension Module (not shown), creating a keypress queue 214 for receiving AT command received via the BthAGATHandler function and creating three separate threads:

A keypress state machine thread 220 that is configured to monitor the incoming AT commands in keypress queue 214 for signals satisfying emergency mode activation and de-activation criteria.

An operating system state and notification monitoring thread 218 that is configured to monitor the Windows Mobile State and Notifications Broker messages to obtain WLAN-WWAN device state and event information (e.g., the incoming call state, etc.). In the particular example of implementation 200, Bluetooth™ Audio Gateway Service 202 provides only AT commands incoming from associated Bluetooth™ WLAN devices to Custom AT Command Extension Module 210 (i.e., it does not call BthAGATHandler for outgoing commands), and communications outbound from the WLAN-WWAN device to the associated Bluetooth™ WLAN device are not provided to Custom AT Command Extension Module 210. As a result, Custom AT Command Extension Module 210 may have insufficient information to determine the operating state of associated Bluetooth™ WLAN devices. Operating system state and notification monitoring thread 218 may provide this information, which may be desirable in order for keypress state machine thread 220 to properly interpret key presses.

An alarm manager thread 222 that initiates and manages alarm handler functionality, which may be implemented in plugin COM object modules located in a COM Library 224 (e.g., SMS Alarm Handler 226 and Phone Alarm Handler 228).

Operating system state and event notifications are monitored by monitoring thread 218. System monitoring thread 218 enables Custom AT command extension module 210 to monitor system state information and event notifications in the operating system of the WLAN-WWAN device. System state information and event notifications may comprise information not apparent from AT commands provided to keypress queue 214. For example, system monitoring thread 218 may be configured to monitor the call state of Bluetooth™ Audio Gateway Service 202 (e.g., the state indicative of whether a call is incoming to the WLAN-WWAN device over the WWAN interface). System monitoring thread 218 may be bound to a Windows Mobile State and Notifications broker, for example. System monitoring thread 218 is configured to provide notification of certain changes in state and/or certain event notifications to keypress state machine thread 220.

In operation, AT commands received via the BthAGATHandler function are placed in keypress queue 214 (received AT commands being generated in response to user keypresses at the associated WLAN device). Optional keypress filter logic 215 may cause select AT commands (e.g., AT commands that do not form part of an emergency mode activation or de-activation signal) to the Default AT Command Extension Module, bypassing keypress queue 214. Keypress state machine thread 220 monitors the keypress queue 214 for patterns of AT commands that satisfy emergency mode activation and de-activation criteria. In some embodiments, signals satisfying certain emergency mode activation and de-activation criteria are recognized as such only when the WLAN-WWAN device is in a particular state (e.g., states indicated by system monitoring thread 218. AT command patterns for emergency mode activation and de-activation criteria may be defined in configuration file 212. AT command patterns for emergency mode activation and de-activation criteria may be user-configured using a configuration application 230.

When keypress state machine thread 220 is not in an emergency mode state, AT commands from keypress queue 214 are passed to the default AT command extension module (not shown). When keypress state machine thread 220 detects a signal satisfying an emergency mode activation criterion in keypress queue 214, it transitions to an emergency mode state. When keypress state machine thread 220 is in an emergency mode state, keypress state machine thread 220 monitors keypress queue 214, and may discard AT commands from keypress queue 214 (i.e. without passing AT commands from keypress queue 214 to the default AT command extension module) and/or may process AT commands differently than the default AT command extension module. Keypress state machine thread 220 is configured to provide notification of its state to alarm manager thread 222. When keypress state machine thread 220 detects a signal satisfying an emergency mode de-activation criterion in keypress queue 214, it transitions to a normal operating mode state.

Alarm manger thread 222 is responsive to the state of keypress state machine 220. When keypress state machine thread 220 is in an emergency mode state, alarm manager thread 222 performs emergency mode operations, which may include dispatching SMS messages via SMS Alarm handler 226 and/or attempting telephone calls via Phone Alarm Handler 228. Emergency mode operations performed by alarm manager thread 222 may be defined in configuration file 212. Emergency mode operations may be user-configured using a configuration application 230. For example, a user may use configuration application 230 to define:

an ordered list of telephone numbers to which SMS message are to be sent in the event of an emergency;
a particular SMS message to be sent in the event of an emergency;
an ordered list of telephone numbers to which telephone calls are to be attempted in an emergency; and
the like.

SMS Alarm handler 226 and Phone Alarm Handler 228 are configured to control functionality of the WLAN-WWAN device on which they are implemented via WLAN-WWAN Device APIs 232. It will be appreciated that when alarm manager thread 222 performs emergency mode operations via SMS Alarm handler 226 and/or Phone Alarm Handler 228, it may be injecting signals into one control path (e.g., the WAN control path for control of the SMS dispatching functionality of the WLAN-WWAN device) in response to an emergency mode activation signal observed on another control path (the control path for AT command functionality, which is monitored by keypress state machine thread 220).

Some embodiments provide for implementing alternative signal mappings along a control path in a personal communications device by changing the configuration of the personal communication device. For instance, some embodiments provide means for installing a signal broker along a control path in a personal communications device, such as by configuring a controller in a personal communications device to perform signal brokering, for example.

Some WLAN devices and WLAN-WWAN devices can be configured and/or reconfigured (e.g., programmed and/or re-programmed). For example, some mobile phones may be configured by information input to the mobile phone via a computer or downloaded to the mobile phone over the Internet. Such configuration information may comprise software applications that add or alter the operation of the mobile phone. Some embodiments provide methods and program products for configuring a personal communications device to implement signal brokering according to embodiments. For example, some embodiments provide a program product comprising a non-transitory medium carrying computer-readable instructions which, when executed by a computer connected to a personal communications device, install a signal broker according to embodiments on the device. In some such embodiments, the computer-readable instructions cause computer-readable instructions to be installed on a memory in the personal computer device accessible to a controller of the personal communications device. For another example, some embodiments provide a program product comprising a non-transitory medium carrying computer-readable instructions which, when executed by a computer connected to a personal communications device, configure a controller of the personal communications device to perform signal brokering according to embodiments. In some such embodiments, the computer-readable instructions cause computer-readable instructions to be installed on a memory in the personal communications device accessible to a controller of the personal communications device.

One particular example embodiment provides a software upgrade package that is configured to be executed on a WLAN-WWAN device running the Windows Mobile Operating system. Upon being executed the software package is configured to install a configuration application, a Custom AT Command Extension Module (DLL), an SMS alarm handler module (DLL), and a phone alarm handler module (DLL), to record the pre-existing registry entries (e.g., BTAGExtModule key values) for any default or pre-installed AT Command Extension Module, and replace them with an entry for the custom Command Extension Module.

It will be appreciated some users use a non-reconfigurable WLAN device in association with a WLAN-WWAN device that is reconfigurable (e.g., a basic Bluetooth™ headset in association with a Bluetooth™-enabled mobile phone). In these circumstances, a user can add emergency functionality to the WLAN device by changing the configuration of the WLAN-WWAN device, without having to change the configuration of the WLAN device. Of course, a WLAN-WWAN device pre-configured to recognize an emergency activation signal that can be generated using the user interface of the WLAN device could also be manufactured.

Some embodiments provide a method for providing alternate mode communication functionality to a personal communications device configured to communicate with a wide area network and having a control path comprising one or more functional modules, the one or more functional modules comprising a LAN interface module, and one or more interfaces for communicating, along the control path and to or from the one or more functional modules, signals generated in response to user input, the one or more interfaces comprising a LAN interface for communicating the signals along the control path and to or from the LAN interface module, the method comprising storing a computer program in a computer readable medium accessible to a host computer, and in response to a request from the personal communications device, transmitting the computer program to the personal communications device, wherein when executed by a controller of the personal communications device, the computer program causes the controller to monitor signals at a monitored interface of the control path, and, upon observing a signal satisfying an alternate mode activation criterion at the monitored interface, inject an alternate mode signal configured to initiate an alternate mode communication over the wide-area network.

Embodiments may find applications in several situations and scenarios. Consider the example of a senior citizen who is working in the garden in his backyard. He has a handsfree Bluetooth™ communicator (i.e., a WLAN device) attached to his shirt. A mobile phone (i.e., a WLAN-WWAN device) according to an example embodiment associated with the handsfree Bluetooth™ communicator is located somewhere inside his house. His daughter calls his mobile phone to check up on him. The mobile phone signals the incoming call to the handsfree device, and the handsfree device rings to alert him to the incoming call. He hears the ringing on the handsfree device and taps a call control button once to receive the call. The tap on the call control button generates a cascade of signals along a control path that spans the LAN interface between the handsfree device and the mobile phone. As a result, the mobile phone answers the call, and the call is connected to the handsfree device. He is able to talk hands free to his daughter while he continues his work in the garden.

Once the conversation is over he taps on the call control button once more to hang up the call. While working in the garden, he steps on a sharp object and badly injures his foot. Realizing that he is bleeding badly and is practically immobile, he taps on the call control button of the handsfree device twice to activate an emergency alert. The pattern of double-tapping the call control button causes an emergency mode activation signal to be generated along the control path that spans the LAN interface between the handsfree device and the mobile phone. A signal broker implemented in the mobile phone that monitors signals at a monitored interface along the control path detects the emergency mode activation signal at the monitored interface. Upon observing the emergency mode activation signal, the signal broker enters an emergency mode, in which it injects an emergency mode signal configured to initiate a telephone call to 911.

The mobile phone connects to 911 and the call is connected to the handsfree device. Speaking into the handsfree device, he is able to clearly explain what kind of injury he has suffered while using both his hands to put pressure on the wound to stop bleeding. Once the 911 operator ensures him that the help is on the way and the call is disconnected, the signal broker performs a next action in an emergency mode routine, injecting another emergency mode signal configured to initiate a telephone call to the nurse of the injured subject. The mobile phone connects to the nurse's telephone and the call is connected to the handsfree device. He explains to the nurse his situation. The nurse immediately dispatches a copy of his medical history to the emergency ward of the local hospital so that the attending doctor has complete knowledge of his health and physiology.

When the call to the nurse is disconnected, the signal broker performs a next action in an emergency mode routine, injecting another emergency mode signal, this one configured to initiate a telephone to the daughter. The mobile phone dials his daughter's number but her line is now busy. Recognizing that the line is busy from signals observed at a monitored interface, the signal broker again injects an emergency mode signal configured to initiate a telephone call to the daughter. This time the call is connected, and father and daughter are able to speak to one another. After talking to her father and relieved that the help is on the way, she heads out to his house to pick up a few of his items for the hospital and to make sure that the house is properly locked.

Consider the example of a nurse in a nursing home. A nurse in the nursing home or a hospital may use a system according to an embodiment to call upon her/his colleagues for help while continuing to use both her hands to attend to the needs of the resident/patient. Such a system may comprise a signal broker configured to dial his/her colleagues one by one and allows him/her to explain the situation and get the right help without having to disrupt his/her current task at hand.

Consider the example of a young female walking towards her car in the parking lot of a train station late at night. She realizes that a suspicious looking character appears to be following her. She is afraid that he may be armed and dangerous and therefore does not want to draw his attention. Instead of getting her mobile phone (i.e., a WLAN-WWAN device) out of her purse and dialling 911, she gently taps twice the call control button on her Bluetooth™ headset (i.e., a WLAN device), which she is wearing in her ear. The emergency alert is activated. The system sends an SMS containing her location to her husband, which it has obtained from a GPS via a location API, and dials 911 as per her emergency contacts list, which she configured. She is able to apprise a 911 operator of her situation without alerting the potential stalker. She is now walking casually and a bit more confidently now that the 911 operator is on the other end of her Bluetooth™ headset. Meanwhile her husband has already passed on her location to 911. The police arrive to the parking lot before any unfortunate incident could occur.

It will be appreciated that embodiments may be implemented on a variety of WLAN-WWAN platforms, including Windows Mobile, Google Android OS, Palm OS, Blackberry OS, iOS, Symbian OS, and the like.

Where a component (e.g. module, broker, controller, device, product, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Those skilled in the art will appreciate that embodiments described herein may be practised or implemented without all of the features ascribed to them herein, and that certain features of embodiments described herein may be used in combination with features of other embodiments described herein. Method embodiments may include features that correspond to features of apparatus embodiments described herein, and vice versa. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations, modifications, additions and permutations are possible in the practice of this invention without departing from the spirit or scope thereof. The embodiments described herein are only examples. Other example embodiments may be obtained, without limitation, by combining features of the disclosed embodiments, by re-arranging the components of disclosed embodiments, and/or by re-ordering the operations of disclosed embodiments. It is therefore intended that the following appended claims and claims hereafter introduced are interpreted to include all such alterations, modifications, permutations, additions, combinations and sub-combinations as are within their true spirit and scope.

What is claimed is:

1. A personal communications device providing a part of a personal communication system configured to facilitate communication between a WLAN device and a wide area network via the personal communications device, the personal communications device is a mobile telephone and the personal communications device comprising:

a control path comprising:
one or more functional modules, the one or more functional modules comprising a LAN interface module; and
one or more interfaces for communicating, along the control path and to or from the one or more functional modules, command signals generated in response to user input at the WLAN device, the one or more interfaces comprising a LAN interface for communicating the command signals along the control path and to or from the LAN interface module; and
a signal broker operatively connected to a monitored interface from among the one or more interfaces, the signal broker configured to:
monitor command signals at the monitored interface;
observe a first command signal of the first type at the monitored interface, the first command signal of the first type corresponding to activation of a first user-input button on the WLAN device and to permit the first command signal to pass through the monitored interface on the control path, thereby causing the mobile telephone to perform a first operation corresponding to the first user-input button;
observe an alternate mode activation criterion at the monitored interface, the alternate mode activation criterion comprising a plurality of command signals of the first type corresponding to a plurality of activations of the first user-input button received at the monitored interface within a threshold temporal period and, in response to observing the alternate mode activation criterion, to inject an alternate mode signal into the control path, the alternate mode signal causing the mobile telephone to initiate an alternate mode communication over the wide area network via the mobile telephone, the alternate mode communication different than the first operation and different than a plurality of the first operations; and
cause the mobile telephone to accept incoming telephone calls only from a member of an emergency contact list and when no call is in progress during the alternate mode communication and to otherwise not accept the incoming telephone calls during the alternate mode communication.

2. The personal communications device of claim 1 wherein the alternate communication is different from a communication, if any, that would have occurred over the wide area network in the absence of the injected alternate mode signal.

3. The personal communications device of claim 1 wherein the alternate mode activation criterion comprises an emergency mode activation criterion and an alternate mode signal comprises an emergency mode signal configured to initiate an emergency communication over the wide area network.

4. The personal communications device of claim 3 wherein the emergency communication comprises at least one of an SMS message, a telephone call, an email and an HTTP command.

5. The personal communications device of claim 1 wherein the signals at the monitored interface comprise messages formatted and exchanged according to pre-defined rules of a communication protocol.

6. The personal communications device of claim 5 wherein the communication protocol comprises a Bluetooth™ Hands-Free Profile control protocol.

7. The personal communications device of claim 6 wherein the command signal pattern of the alternate mode activation criterion comprises a plurality of AT commands within the threshold time period.

8. The personal communication device in claim 1 wherein the signal broker is configured to inject the alternate mode signal at the monitored interface.

9. The personal communications device of claim 1 wherein the signal broker is configured to inject the alternate mode signal at an interface other than the monitored interface along the control path.

10. The personal communications device of claim 1 wherein the signal broker is configured to inject the alternate mode signal at an interface of a WAN control path other than the control path.

11. The personal communications device of claim 10 wherein the interface of the WAN control path comprises an application programming interface and the alternate mode signal comprises a call to the application programming interface.

12. The personal communications device of claim 1 wherein the alternate mode activation criterion is user configurable.

13. The personal communications device of claim 1 wherein the one or more interfaces are configured to communicate, along the control path and to or from the one or more functional modules, signals generated in response to user input entered at the WLAN device.

14. The personal communications device of claim 1 wherein the alternate communication is user configurable.

15. The personal communications device of claim 1 wherein the signal broker is configured to, in a normal operating mode, monitor signals at the monitored interface without modification and, upon observing the alternate mode activation criterion, enter an alternate operating mode.

16. The personal communications device of claim 1 wherein the signal broker is configured to, upon observing the alternate mode activation criterion, discard the plurality of command signals corresponding to the command signal pattern of the alternate mode activation criterion.

17. The personal communications device of claim 1 comprising a sensor configured to provide data indicative of a user's condition, wherein the signal broker is operatively connected to the sensor and configured to obtain data indicative of the user's condition from the sensor and wherein the alternate mode signal is configured to initiate an alternate communication containing data indicative of the user's condition over the wide area network.

18. A program product comprising a non-transitory medium carrying computer-readable instructions which, when executed by a controller in a personal communications system configured to facilitate communication between a WLAN device and a wide area network via a mobile telephone, cause the controller to:
monitor command signals at a monitored interface of a control path in the mobile telephone, the control path comprising:
one or more functional modules, the one or more functional modules comprising a LAN interface module; and
one or more interfaces for communicating, along the control path and to or from the one or more functional modules, command signals generated in response to user input at the WLAN device, the one or more interfaces comprising a LAN interface for communicating the command signals along the control path and to or from the LAN interface module;
observe a first command signal of a first type at the monitored interface, the command signal of the first type corresponding to activation of a first user-input button on the WLAN device, and permit the first command signal to pass through the monitored interface on the control path, thereby causing the mobile telephone to perform a first operation corresponding to the first user-input button;

observe an alternate mode activation criterion at the monitored interface, the alternate mode activation criterion comprising a plurality of command signals of the first type corresponding to a plurality of activations of the first user-input button received at the monitored interface within a threshold temporal period and, in response to observing the alternate mode activation criterion, inject an alternate mode signal into the control path, the alternate mode signal causing the mobile telephone to initiate an alternate mode communication over the wide area network via the mobile telephone, the alternate mode communication different than the first operation and different than a plurality of the first operations; and cause the mobile telephone to accept incoming telephone calls only from a member of an emergency contact list and when no call is in progress during the alternate mode communication and to otherwise not accept incoming telephone calls during the alternate mode communication.

19. A method in a personal communications system configured to facilitate communication between a WLAN device and a wide area network via a mobile telephone, the method comprising:

monitoring command signals at a monitored interface of a control path in the mobile telephone, the control path comprising:

one or more functional modules, the one or more functional modules comprising a LAN interface module; and one or more interfaces for communicating, along the control path and to or from the one or more functional modules, command signals generated in response to user input at the WLAN device, the one or more interfaces comprising a LAN interface for communicating the command signals along the control path and to or from the LAN interface module; and observing a first command signal of a first type at the monitored interface, the command signal of the first type corresponding to activation of a first user-input button on the WLAN device, and permitting the first command signal to pass through the monitored interface on the control path, thereby causing the mobile telephone to perform a first operation corresponding to the first user-input button;

observing an alternate mode activation criterion at the monitored interface, the alternate mode activation criterion comprising a plurality of command signals of the first type corresponding to a plurality of activations of the first user-input button received at the monitored interface within a threshold temporal period and, in response to observing the alternate mode activation criterion, injecting an alternate mode signal into the control path, the alternate mode signal causing the mobile telephone to initiate an alternate mode communication over the wide area network via the mobile telephone, the alternate mode communication different than the first operation and different than a plurality of the first operations accepting incoming telephone calls at the mobile telephone only from a member of an emergency contact list and when no call is in progress during the alternate mode communication and otherwise not accepting incoming telephone calls at the mobile telephone during the alternate mode communication.

20. The personal communications device of claim 1 wherein the signal broker is further configured to: observe an alternate mode deactivation signal at the monitored interface; and, in response to observing the alternate mode deactivation signal, cause the WLAN device to announce to a user that the alternate mode communication has ended.

21. The program product of claim 18 wherein the computer-readable instructions which, when executed by the controller in the personal communications system, cause the controller to: observe an alternate mode deactivation signal at the monitored interface; and, in response to observing the alternate mode deactivation signal, cause the WLAN device to announce to a user that the alternate mode communication has ended.

22. A method according to claim 19 further comprising: observing an alternate mode deactivation signal at the monitored interface; and, in response to observing the alternate mode deactivation signal, causing the WLAN device to announce to a user that the alternate mode communication has ended.

* * * * *